(12) United States Patent
Planitzer et al.

(10) Patent No.: US 8,521,632 B2
(45) Date of Patent: Aug. 27, 2013

(54) PROCESSING SECURITIES-RELATED INFORMATION

(75) Inventors: Russell E. Planitzer, New York, NY (US); Mark Asdoorian, Lynn, MA (US); David Brown, Sudbury, MA (US); Ying Chen, Fitchburg, MA (US); Leonard Driscoll, Andover, MA (US); Jeffrey B. Levering, Harvard, MA (US); Alex Magary, Andover, MA (US)

(73) Assignee: Broadridge Content Solutions, Inc., Jersey City, NJ (US)

( * ) Notice: Subject to any disclaimer, the term of this patent is extended or adjusted under 35 U.S.C. 154(b) by 425 days.

(21) Appl. No.: 12/508,987

(22) Filed: Jul. 24, 2009

(65) Prior Publication Data

US 2010/0161508 A1    Jun. 24, 2010

Related U.S. Application Data

(63) Continuation-in-part of application No. 10/135,834, filed on Apr. 30, 2002, now abandoned.

(51) Int. Cl.
*G06Q 40/00* (2012.01)

(52) U.S. Cl.
USPC ........... 705/36 R; 705/51; 705/344; 705/904; 705/908

(58) Field of Classification Search
USPC ........................................ 705/2, 3, 11, 66–70
See application file for complete search history.

(56) References Cited

U.S. PATENT DOCUMENTS

| | | | | |
|---|---|---|---|---|
| 6,122,635 | A | * | 9/2000 | Burakoff et al. .................. 1/1 |
| 6,138,130 | A | * | 10/2000 | Adler et al. .................. 715/210 |
| 7,100,195 | B1 | * | 8/2006 | Underwood .................. 726/2 |

OTHER PUBLICATIONS

FpML Architecture Version 1.0 Recommendation Mar. 16, 2001. http://www.fpml.org/spec/2001/rec-fpml-arch-1-0-2001-03-16. (c) 1999-2002.*
Meriam-Webster Dictionary. Defining the Word "Context". Accessed Sep. 10, 2012.*
Herbert F Schantz. Standards that Will Change the Global Information Environment in the Next Millennium. Work Process Improvement Today; Feb. 1998; 20,1; ProQuest Central. p. 16.*
Robert Edward Schlosser. A Study of the Function of the Corporate Balance Sheet. ProQuest Dissertations and Theses; 1955; ProQuest Dissertations & Theses Full Text. page. n/a.*
Richard Joseph Long. The Effects of Employee Ownership on Job Attitudes and Organizational Performance: An Exploratory Study. ProQuest Disserations and Theses; 1977; ProQuest Dissertations & Theses Full Text. page. n/a.*

* cited by examiner

*Primary Examiner* — Muriel Tinkler
(74) *Attorney, Agent, or Firm* — Greenberg Traurig, LLP

(57) ABSTRACT

Embodiments of the invention provide techniques for improving clarity of disclosure materials provided to investors, by enabling securities issuers, intermediaries and/or other entities to create and disseminate clear and concise summary-level information on individual securities to investors to enable informed investment decisions. The information may include a summary version of the full statutory prospectus (a "summary prospectus"). A summary prospectus may include a concise, "plain English" synopsis and/or representation of certain information contained in the full statutory prospectus, such as a security's investment objectives and strategies, costs, risks and/or other information.

8 Claims, 30 Drawing Sheets

FIG. 1

101 — THE XYZ FUND / CLASS A & B SHARES
100
112 — http://www.xyzfund.com
102 — SUMMARY PROSPECTUS 103 { INVESTMENT OBJECTIVE: INCOME AND CAPITAL APPRECIATION CONSISTENT WITH REASONABLE RISKS.

104 {
FEES AND EXPENSES:

|  | CLASS A | CLASS B |
|---|---|---|
| SHAREHOLDER FEES (PAID FROM YOUR INVESTMENT) | | |
| MAX. SALES CHARGE IMPOSED ON PURCHASES | 5.75% | - |
| MAX. DEFERRED SALES CHARGE | - | 5.00% |
| ANNUAL FUND OPERATING EXPENSES | | |
| MANAGEMENT FEES | 0.66% | 0.66% |
| DISTRIBUTION (12b-1) FEES | 0.00% | 0.75% |
| SERVICE (12b-1) FEES | 0.23% | 0.23% |
| OTHER | 0.28% | 0.46% |
| TOTAL | 1.17% | 2.10% |

105 { PRINCIPAL INVESTMENT STRATEGIES: THE FUND INVESTS MAINLY IN COMMON STOCKS, BOND AND NOTES OF U.S. AND FOREIGN COMPANIES.

106 {
PRINCIPAL RISKS:
1: YOU COULD LOSE MONEY INVESTING IN THE FUND.
2:
3:

107 { ANNUAL TOTAL RETURN: THE FOLLOWING BAR CHART AND TABLE PROVIDE AN INDICATION OF THE RISKS OF INVESTING IN THE FUND. THE BAR CHART SHOWS CHANGES IN THE FUND'S PERFORMANCE FROM YEAR TO YEAR FOR CLASS A SHARES. THE TABLE SHOWS HOW THE FUND'S AVERAGE ANNUAL RETURNS FOR 1,5 AND 10 YEARS COMPARED WITH A BROAD MEASRUE OF MARKET PERFORMANCE. THE FUND'S PAST PERFORMANCE (BEFORE AND AFTER TAXES) IN NOT NECESSARILY AN INDICATION OF HOW THE FUND WILL PERFORM IN THE FUTURE. SALES CHARGES ARE NOT REFLECTED IN THE BAR CHART, AND IF THOSE CHARGES WERE INCLUDED, RETURNS WOULD BE LESS THAN THOSE SHOWN.

[Bar chart showing values from -10 to 10 for years 1997-2006]

| AVERAGE ANNUAL TOTAL RETURNS | 1 YEAR | 5 YEARS | 10 YEARS |
|---|---|---|---|
| CLASS A, RETURNS BEFORE TAXES | 4.04% | 5.72% | 7.26% |
| CLASS A, RETURN ON DISTRIBUTIONS AFTER TAXES | 2.48 | 4.52 | 5.05 |
| CLASS A, RETURN ON DISTRIBUTIONS AND SALES | 2.30 | 4.34 | 4.90 |
| CLASS B, RETURN BEFORE TAXES | 4.38 | 5.62 | 7.12 |
| S&P 500 INDEX | 15.79 | 6.19 | 8.42 |

108 { INVESTMENT ADVISOR: XYZ MANAGEMENT COMPANY, INC.

109 { PORTFOLIO MANAGER: JOHN E. SMITH, CFA. MR. SMITH HAS MANAGED THE FUND SINCE 2005.

110 { PURCHASE AND SALE OF FUND SHARES: YOU MAY PURCHASE OR REDEEM SHARES OF THE FUND ON ANY BUSINESS DAY ONLINE THROUGH OUR WEB SITE AT (URL), BY MAIL (ADDRESS) OR BY TELEPHONE AT (NUMBER). YOU MAY PURCHASE SHARES BY EBT, CHECK OR WIRE.

111 { PAYMENTS TO BROKER-DEALERS AND OTHER INTERMEDIARIES: IF YOU PURCHASED THE FUND THROUGH A B-D, THE FUND MAY PAY THE INTERMEDIARY FOR THE SALE OF FUND SHARES AND RELATED SERVICES. THESE PAYMENTS MAY INFLUENCE THE INTERMEDIARY TO RECOMMEND THE FUND OVER ANOTHER INVESTMENT. ASK THE INTERMEDIARY OR VISIT ITS WEBSITE FOR MORE INFORMATION.

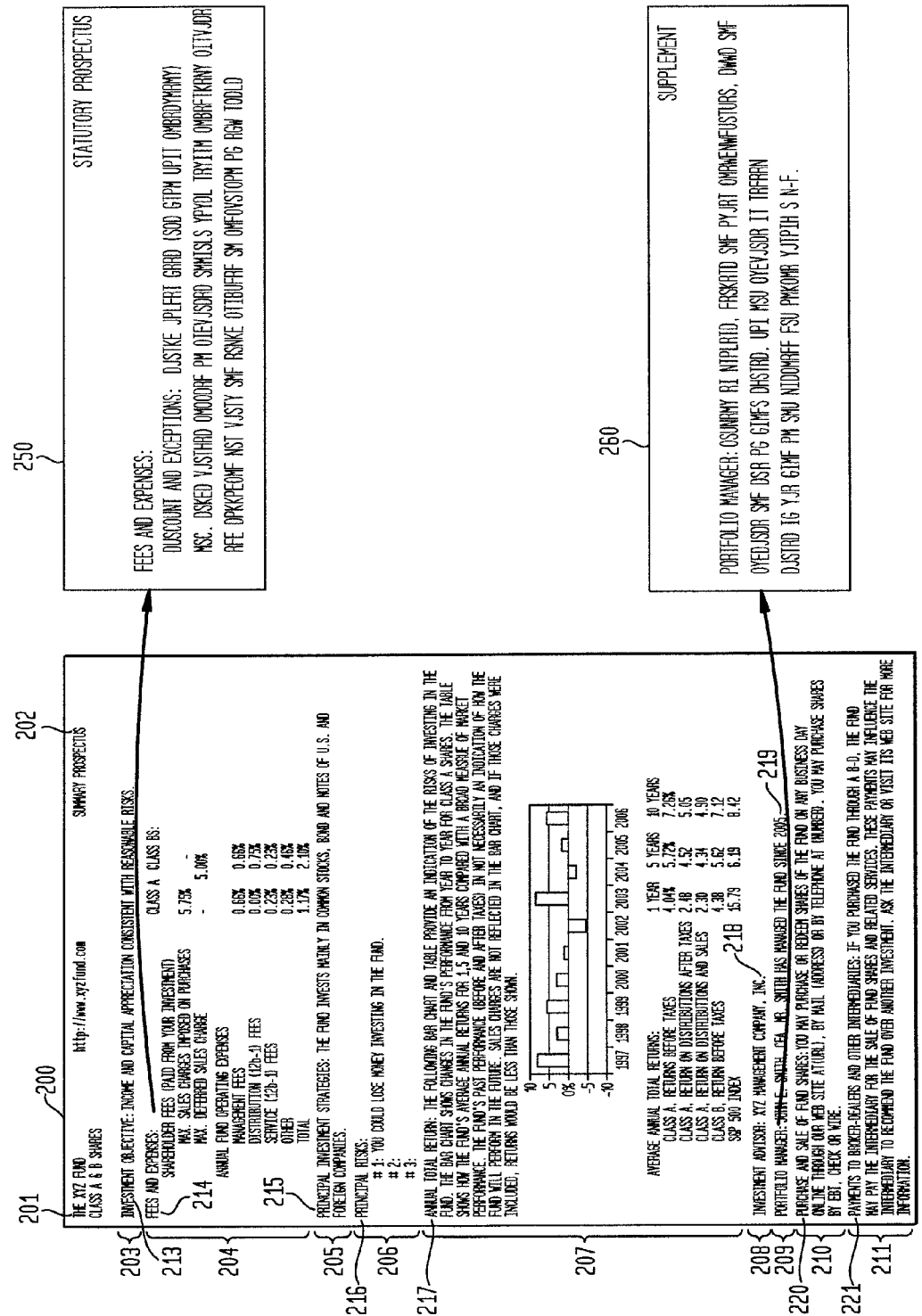

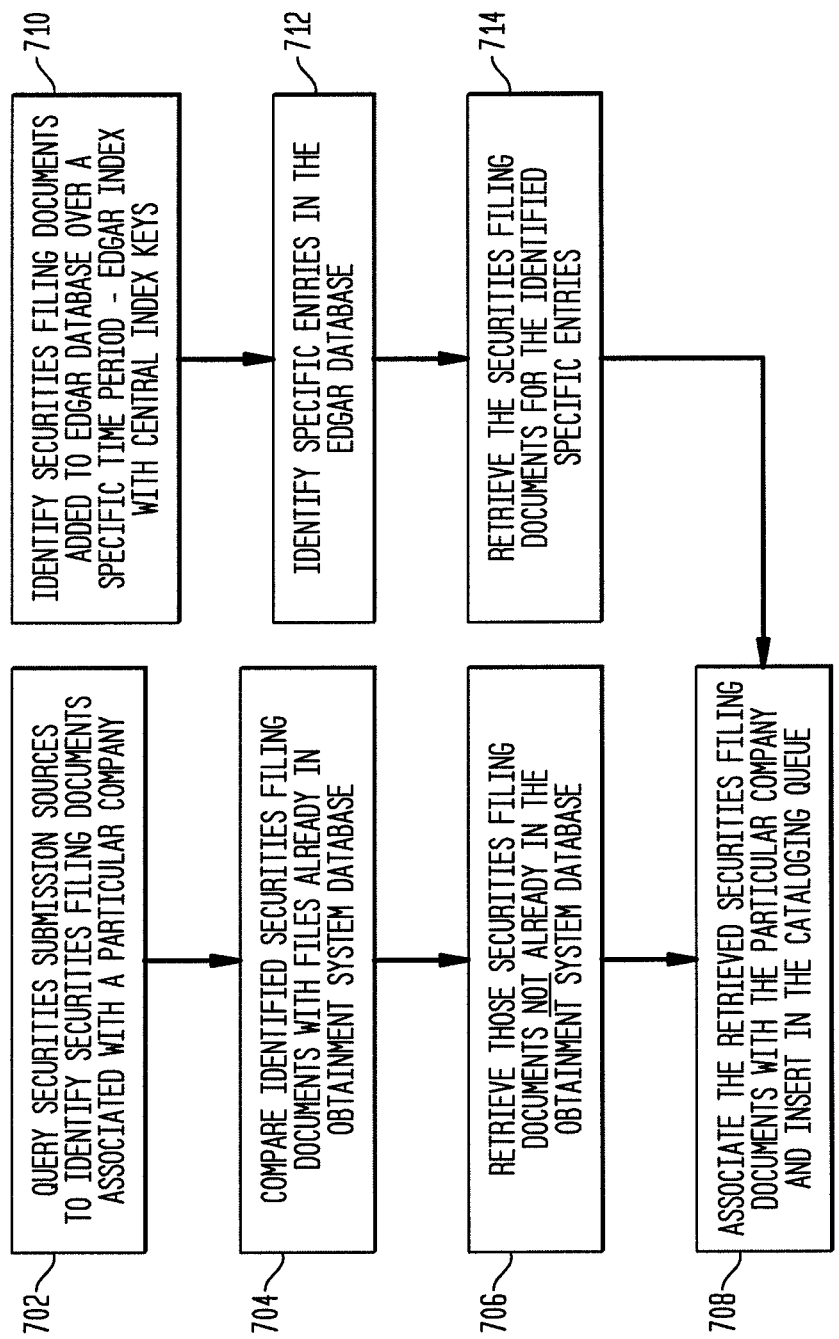

FIG. 8

```
-----BEGIN PRIVACY-ENHANCED MESSAGE-----
Proc-Type: 2001,MIC-CLEAR
Originator-Name: webmaster@www.sec.gov
Originator-Key-Asymmetric:
 MFgwCgYEVQgBAQICAf8DSgAwRwJAW2sNKK9AVtBzYZmr6aGjlWyK3XmZv3dTINen
 TWSM7vrzLADbmYQaionwg5sDW3P6oaM5D3tdezXMm7zlT+B+twIDAQAB
MIC-Info: RSA-MD5,RSA,
 WlEIhhgb76ElkHlm53vLvWNWqMz6PI2iXMB7fir2LJtNR305u+W6BXx97C8EqpIJ
 TNomQs4keqZ80HToiPubeA==

<SEC-DOCUMENT>0000932471-00-000301.txt : 20000225
<SEC-HEADER>0000932471-00-000301.hdr.sgml : 20000225
ACCESSION NUMBER:        0000932471-00-000301
CONFORMED SUBMISSION TYPE:    NSAR-B
PUBLIC DOCUMENT COUNT:        19
CONFORMED PERIOD OF REPORT:   19991231
FILED AS OF DATE:        20000224

FILER:
    COMPANY DATA:
        COMPANY CONFORMED NAME:      VANGUARD INDEX TRUST
        CENTRAL INDEX KEY:                      0000036405
        STANDARD INDUSTRIAL CLASSIFICATION:   [ ]
        IRS NUMBER:                             231999755
        FISCAL YEAR END:                        1231

FILING VALUES:
        FORM TYPE:       NSAR-B
        SEC ACT:
        SEC FILE NUMBER: 811-02652
        FILM NUMBER:            552346

BUSINESS ADDRESS:
        STREET 1:     PO BOX 2600
        STREET 2:     VM #V34
        CITY:         VALLEY FORGE
        STATE:        PA
        ZIP:          19482
        BUSINESS PHONE:    6106696289

FORMER COMPANY:
        FORMER CONFORMED NAME:   FIRST INDEX INVESTMENT TRUST
        DATE OF NAME CHANGE:     19800904
</SEC-HEADER>
<DOCUMENT>
```

CATALOGING STEPS

FIG. 19

```
<!ELEMENT DOCUMENT ( DOCTYPE, SAN, FORMTYPE, FILINGDATE,
FUNDLIST, DOCTEXT ) >

<!ELEMENT DOCTYPE (#PCDATA) >

<!ELEMENT SAN (#PCDATA) >

<!ELEMENT FORMTYPE (#PCDATA) >

<!ELEMENT FILINGDATE (#PCDATA) >

<!ELEMENT FUNDLIST (FUND*) >
        <!ELEMENT FUND (FUNDID, FUNDNAME, EFFECTIVEDATE) >
            <!ELEMENT FUNDID (#PCDATA) >
            <!ELEMENT FUNDNAME (#PCDATA) >
        <!ELEMENT EFFECTIVEDATE (#PCDATA) >

<!ELEMENT DOCTEXT (#PCDATA |
PERFORMANCE.ANNUALTOTALRETURNS )* >

<!ELEMENT PERFORMANCE.ANNUALTOTALRETURNS (#PCDATA |
RETURNS | INSERTCHART)* >
            <!ATTLIST PERFORMANCE.ANNUALTOTALRETURNS
               FUNDID CDATA #REQUIRED >

<!ELEMENT RETURNS (#PCDATA) >
           <!ATTLIST RETURNS
              PERIOD CDATA #REQUIRED >

<!ELEMENT INSERTCHART EMPTY >
```

FIG. 20

```
<FUNDLIST>
<FUNDLIST><FUNDID>471023101</FUNDID><FUNDNAME>Janus Fund</FUNDNAME><EFFECTIVEDATE>2000-01-31</EFFECTIVEDATE></FUND><FUND><FUNDID>471023200</FUNDID><FUNDNAME>Janus Growth and Income Fund</FUNDNAME><EFFECTIVEDATE>2000-01-31</EFFECTIVEDATE></FUND><FUND><FUNDID>471023655</FUNDID><FUNDNAME>Janus Strategic Value Fund</FUNDNAME><EFFECTIVEDATE>2000-01-31</EFFECTIVEDATE></FUND><FUND><FUNDID>471023739</FUNDID><FUNDNAME>Janus Special Situations Fund</FUNDNAME><EFFECTIVEDATE>2000-01-31</EFFECTIVEDATE></FUND><FUND><FUNDID>471023747</FUNDID><FUNDNAME>Janus Equity Income Fund</FUNDNAME><EFFECTIVEDATE>2000-01-31</EFFECTIVEDATE></FUND><FUND><FUNDID>471023804</FUNDID><FUNDNAME>Janus Enterprise Fund</FUNDNAME><EFFECTIVEDATE>2000-01-31</EFFECTIVEDATE></FUND><FUND><FUNDID>471023853</FUNDID><FUNDNAME>Janus Mercury Fund</FUNDNAME><EFFECTIVEDATE>2000-01-31</EFFECTIVEDATE></FUND><FUND><FUNDID>471023879</FUNDID><FUNDNAME>Janus Balanced Fund</FUNDNAME><EFFECTIVEDATE>2000-01-31</EFFECTIVEDATE></FUND>
</FUNDLIST>
```

FIG. 21

<PERFORMANCE.ANNUALTOTALRETURNS FUNDID="471023101"><INSERTCHART/>
Annual Returns for periods ended 12/31

<TABLE>
<C>       <C>       <C>       <C>       <C>       <C>       <C>       <C>       <C>       <C>
<C>       <C>       <C>       <C>       <C>       <C>       <C>       <C>       <C>       <RETURNS
<RETURNS PERIOD="1990">(0.74%)</RETURNS> <RETURNS PERIOD="1992">10.92</RETURNS>  <RETURNS PERIOD="1991">42.80</RETURNS>% <RETURNS
PERIOD="1992"6.87</RETURNS>% <RETURNS PERIOD="1995">29.43</RETURNS>  <RETURNS
PERIOD="1994"(1.10%)</RETURNS> <RETURNS PERIOD="1997">22.72</RETURNS>% <RETURNS
PERIOD="1996"19.61</RETURNS>% <RETURNS PERIOD="1999">47.13</RETURNS>% <RETURNS
PERIOD="1998"38.89</RETURNS>%
    1990  1991  1992  1993  1994  1995  1996  1997  1998  1999
</TABLE>, </PERFORMANCE.ANNUALTOTALRETURNS>

PROCESSING SECURITIES-RELATED INFORMATION

RELATED APPLICATIONS

This application is a continuation-in-part of commonly assigned U.S. patent application Ser. No. 10/135,834, entitled "System For Mapping Financial Disclosure Data Into Compliance Information," filed Apr. 30, 2002, the entirety of which is incorporated herein by reference.

FIELD

This invention relates to processing information relating to securities, such as compliance information relating to a mutual fund or other non-corporate security.

BACKGROUND INFORMATION

Government agencies and securities exchanges require that certain information on a security be made available to an investor before the security may be sold to the investor, and that certain information be delivered to the investor with the confirmation of any transaction. The delivery of this information has historically taken place either in person, or via document delivery services, such as the U.S. Mail, Federal Express, or United Parcel Service. Recently, government agencies and securities exchanges have begun allowing securities issuers and intermediaries to comply with information delivery requirements by approving the delivery of the information in an electronic format, for example, by transmitting the information from one computer to another over a computer network.

Securities information is available in various electronic databases, including the United States Securities and Exchange Commission's ("SEC's") EDGAR database. EDGAR, the Electronic Data Gathering, Analysis, and Retrieval system, performs automated collection, validation, indexing, acceptance, and forwarding of submissions by companies and others that are required by law to file information with the SEC. The primary purpose of EDGAR is to increase the efficiency and fairness of the securities market for the benefit of investors, corporations, and the economy by accelerating the receipt, acceptance, dissemination, and analysis of time-sensitive corporate information filed with the agency. EDGAR information is available on the Internet at www.sec.gov.

Although securities information is available from databases like EDGAR, the information is not provided in a useful electronic format that enables compliance with government and securities exchange regulations, especially with regard to mutual funds and other non-corporate securities. EDGAR, as a result of its design, makes information regarding non-corporate securities difficult to find. In EDGAR, mutual fund information, for example, is listed as a submission of the corporate issuer, not the fund name that is marketed to the consumer, and one submission may include information for more than one mutual fund. EDGAR submissions also may include updates and amendments to earlier submitted information. It is quite possible for a single mutual fund to have more than fifty amendments to its compliance information. An investor attempting to locate the complete set of compliance information for a mutual fund directly from EDGAR would need to retrieve all applicable amendments. This is time-consuming, and it is difficult for the investor, when attempting to gather compliance information from EDGAR, to know if all the amendments have actually been located, if the retrieved information about the fund is complete, or if the retrieved information is up-to-date.

SUMMARY OF THE INVENTION

Some embodiments of the invention provide a computer-implemented method of processing a body of data representing a prospectus issued for at least one mutual fund. The method comprises: (A) locating, within the body of data, one or more data elements each having at least one attribute within a predefined set of attributes; (B) inserting one or more markers into the body of data to indicate the presence of the data element(s) located in (A); (C) using the marker(s) inserted in (B), generating a representation of the prospectus; and (D) making the representation of the prospectus available for a recipient to access.

Other embodiments of the invention provide a computer-implemented method of providing information relating to at least one mutual fund to a user. The method comprises: (A) processing data representing a statutory prospectus issued for the at least one mutual fund to retrieve one or more data elements, each satisfying predefined attributes, from the data, the data representing the statutory prospectus including detailed information corresponding to each of the one or more data elements; (B) generating a summary prospectus comprising the one or more data elements; and (C) making the summary prospectus available to the user in a form that enables access to the detailed information corresponding to each of the one or more data elements.

Still other embodiments of the invention provide a computer-implemented method of providing information relating to at least one mutual fund. The method comprises: (A) making available to a user a representation of a statutory prospectus for the at least one mutual fund, the statutory prospectus comprising detailed information for the at least one mutual fund, the representation of the statutory prospectus comprising one or more data elements found within the statutory prospectus, each of the one or more data elements corresponding to a portion of the detailed information, the representation of the statutory prospectus being made available to the user in a form which enables the user access to the detailed information corresponding to each of the one or more data elements.

Still other embodiments of the present invention provide a computer-implemented method of processing data representing a statutory prospectus for at least one mutual fund and a summary prospectus corresponding to the statutory prospectus. The method comprises: (A) identifying, within the data representing the summary prospectus, one or more data elements, each having at least one attribute within a predefined set of attributes; (B) locating, within the data representing the statutory prospectus, one or more portions comprising detailed information, each portion comprising detailed information which corresponds to one of the one or more data elements; (C) inserting, within the data representing the summary prospectus, at least one reference for each data element located in (A), wherein each reference for a data element is to a portion corresponding to the data element located in (B); and (D) enabling a user to employ a reference inserted in (C) to access a portion of the data located in (B) corresponding to a data element.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1 is a representation of an example hard copy summary prospectus, in accordance with some embodiments of the present invention;

FIG. 2 is a representation of an example online version of a summary prospectus, in accordance with some embodiments of the invention;

FIG. 7 is a flowchart of an example method for responding to requests for information, in accordance with some embodiments of the invention;

FIG. 8 is a representation of an example interface displaying retrieved information, in accordance with some embodiments of the invention;

FIG. 19 is a representation of example tagged data, in accordance with some embodiments of the invention;

FIG. 20 is a representation of example tagged data, in accordance with some embodiments of the invention;

FIG. 21 is a representation of example tagged data, in accordance with some embodiments of the invention;

DESCRIPTION

I. Overview

Figure 3:
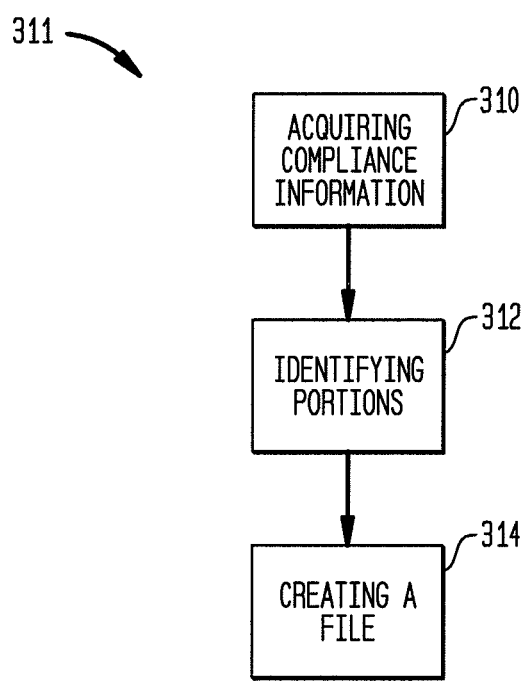
FIG. 3 is a flowchart of an example method for processing compliance information, in accordance with some embodiments of the present invention.

Various embodiments of the invention provide capabilities designed to improve the clarity of disclosure materials provided by securities issuers to investors, by enabling securities issuers and/or intermediaries (e.g., broker/dealers, other distributors, etc.) to create and disseminate clear, concise summary-level information on individual securities to investors and potential investors (hereinafter collectively referred to as "investors" for simplicity and convenience), so as to enable investors to make informed investment decisions.

This information may include, for example, a summary version of the full statutory prospectus which all securities issuers are required to provide to investors. This summary version is referred to herein as a "summary prospectus." In some embodiments, a summary prospectus may include a concise, "plain English" synopsis and/or representation of certain information contained in the full statutory prospectus (to which the summary prospectus may, in some embodiments, be a counterpart), such as a security's investment objectives and strategies, costs, and risks, etc. Information in the summary prospectus may be presented in a standardized sequence (e.g., defined by the Securities and Exchange Commission), with certain key information being presented in individual sections. In addition to a concise synopsis and/or representation of key information, the summary prospectus may indicate to the investor where more detailed information on each topic addressed in the summary prospectus may be found, such as via references to locations in the full statutory prospectus and/or other documents, so that it facilitates a "layered disclosure" of information about the security, with information in the summary prospectus forming a first layer and information in underlying detailed documents forming further layers.

In some embodiments, a summary prospectus may be disseminated at least in part via the Internet (e.g., via email, presented on a web page, etc.) to facilitate the layered disclosure of information on one or more securities to investors. For example, a hard copy summary prospectus delivered to an investor may include a reference (e.g., a Uniform Resource Locator, or URL) to a web page presenting an online version of the summary prospectus which largely replicates the standardized order in which information is presented by the hard copy summary prospectus. Each section of the online version of the summary prospectus may include one or more links to more detailed information on the summary-level information on a given topic presented in the section. For example, each link may reference a location within an electronic version of the full statutory prospectus or another document. As such, the investor may readily navigate between sections of the summary prospectus and more detailed information provided within one or more other documents as desired. As a result, materials disclosing important information about the security may be made more accessible and user-friendly to the investor, as well as to intermediaries, financial analysts and other users, enabling these parties to more easily compare different securities across one or more dimensions, and thereby make more informed investment decisions.

An example format for a summary prospectus and corresponding online version are depicted in FIGS. 1 and 2, respectively. Example summary prospectus 100 (FIG. 1) includes an indication 101 of a security to which it relates, a title 102, and various sections each providing information about the considered security in summary-level, synopsis form. For example, section 103 provides information on the security's investment objective, section 104 provides information on its associated fees and expenses, section 105 provides information on its principal investment strategies, section 106 provides information on principal risks associated with its investments, section 107 provides information on annual returns earned in prior periods, section 108 provides information on its investment advisor, section 109 provides information on its fund manager, section 110 provides information on the purchase and sale of security shares, dividends, capital gains and taxes, and section 111 provides information on payments to broker/dealers and/or other intermediaries. Of course, a summary prospectus is not limited to presenting the information shown in example summary prospectus 100, as any suitable information (including additional or different information) regarding any one or more securities may be presented. In addition, a summary prospectus may present information relating to a mutual fund, although the invention is not limited to such an implementation. Embodiments of the invention may provide information relating to any one or more types of securities, including mutual funds, variable annuities, exchange traded funds, and/or any other type(s) of security. Embodiments of the invention are not limited to any particular implementation.

Summary prospectus 100 also includes URL 112, which in the embodiment depicted references an online version of the summary prospectus which provides an investor with access to more detailed information on the security. If summary prospectus 100 is provided to the investor in hard copy, printed form, then the investor may enter the URL into the address bar provided by a browser program (not shown) to access the online version. If summary prospectus 100 is provided to the investor in electronic form (e.g., in an electronic document e-mailed to the investor), then the URL may be "clickable" by the investor to bring the investor to the online version.

An example online version 200 of summary prospectus 100 is shown in FIG. 2. In many respects, online version 200 is similar to summary prospectus 100, as it includes much of the same summary-level information included in summary prospectus 100, presented in much the same order. Specifically, in the example shown, online version 200 includes indication 201 of the security to which the web page relates, title 202, and sections 203-211 which correspond to sections 103-111 shown in FIG. 1. Of course, the invention is not limited to such an implementation, as an online version of a summary prospectus may include any suitable information, which may or may not correlate directly to information presented in a summary prospectus. The invention is not limited to any particular implementation.

In example online version 200, each of sections 203-211 includes the same information as is presented in the corresponding section of summary prospectus 100, as well as a link (e.g., a hypertext link) to more detailed information regarding the considered topic. For example, section 204 includes information on the security's fees and expenses, and includes link 214 which references more detailed information on the security's fees and expenses, which (in this example) is included within an electronic version of a full statutory prospectus 250 for the security, which includes information on discounts and/or exemptions for inventors who satisfy certain criteria. By clicking link 214, the investor is taken to location 251 within the statutory prospectus which includes this detailed information, so that the investor may review the detailed information before deciding whether to invest in the security.

Of course, a link within an online version of a summary prospectus need not reference a statutory prospectus, as any suitable document(s) or information may be referenced. For example, section 209 includes information on the security's fund manager, and includes link 219 which references more detailed information on the fund's manager. If the investor notices that there has been a change to the security's fund manager since he/she last reviewed disclosure information (e.g., the last statutory prospectus sent to the investor), he/she may click link 219, which in this example references a location within an electronic version of a supplement 260 (i.e., a "sticker") to the prospectus. The supplement may have been issued after the last full statutory prospectus, and may provide more up-to-date detailed information regarding the new fund manager, such as his/her prior management experience and/or tenure at the securities issuer, than the last statutory prospectus.

It should be appreciated that a link within an online version of a summary prospectus need not reference a specific location within an underlying detailed document at which detailed information is contained. For example, a link may reference a table of contents in an underlying document (or other information) which indicates to the investor where information on a considered topic may be found, may reference a start of the document (allowing the investor to find the detailed information herself), or reference any other suitable location(s).

In example online version 200, each section includes a link to more detailed information. Thus, in this example, a user may click on link 213 to access detailed information on the security's investment objective, link 214 to access detailed information on its associated fees and expenses, link 215 to access detailed information on its principal investment strategies, link 216 to access detailed information on principal risks associated with its investments, link 217 to access detailed information on annual returns earned in prior periods, link 218 to access detailed information on its investment advisor, link 219 to access detailed information on its fund manager, link 220 to access detailed information on the purchase and sale of shares, dividends, capital gains and taxes, and link 221 to access detailed information on payments to broker/dealers and/or other intermediaries. It should be appreciated that an online version need not include a link in each section, no link, or more than one link, may be provided in a section of an online version. Embodiments of the invention are not limited to any particular implementation.

Using the links provided in online version 200 to access underlying detailed information, the investor may readily navigate between "layers" of disclosure on the security. In this respect, the disclosure in summary prospectus 100 may be considered as providing a first layer of information, including a concise synopsis of certain key information considered important to many investors. Using URL 112, the investor may access the second layer provided within online version 200, which may include much the same information as summary prospectus 100 but also enable access to underlying detailed information. Using the links provided in online version 200, the investor may access this detailed information, and move back and forth between detailed and summary-level information, thereby quickly and easily gaining access to information on the topic(s) that he/she considers most important when selecting a security for investment.

Some embodiments of the invention provide a system for making a summary prospectus and/or online version thereof available to investors. For example, when a securities issuer publishes a new summary prospectus for a security (e.g., by submitting it to EDGAR), embodiments may automatically acquire the summary prospectus document, process it to identify certain information contained therein, and prepare it for dissemination via any of various media. For example, processing the document to identify information contained therein may enable creation of an online version of the document, as well as logical associations between the information in the summary prospectus and corresponding detailed information provided in other documents (which may be similarly processed via embodiments of the invention to identify this detailed information and/or its location within the other documents). These logical associations may be used to create references (e.g., hypertext links) which are included within the online version, thereby enabling the user to accomplish the navigation between summary-level and detailed information described above.

Some embodiments of the invention provide an online facility with which not only an online version of a summary prospectus, but also other documents and materials relating to a considered security, may be made available to investors. For example, the online facility may provide access to a repository of documents disseminated over time by the issuer and/or distributors of the security. The facility may, for example, allow investors reviewing an online version of a summary prospectus (e.g., after entering a URL provided in a hard copy summary prospectus into a browser application) to readily determine whether more current information on the security (e.g., a newer summary prospectus, perhaps referenced by a URL in a newer hard copy summary prospectus than that which was reviewed by the investor) is available. In addition, the facility may allow the investor access to historical detail on the security.

Some embodiments of the invention may provide a capability to prepare a summary prospectus for dissemination in hard copy form. For example, some embodiments of the invention may provide a service provider with the capability to alter the aesthetic characteristics and/or content of a document submitted by a securities issuer to EDGAR, such as by adding branding elements or other visual enhancements supplied by the securities issuer and/or distributor, such as a broker/dealer through which the investor purchased the security. Some embodiments of the invention may also provide a capability to suppress the creation and/or delivery of certain versions of the summary prospectus (e.g., to suppress delivery to investors that previously received those versions). Aspects of these embodiments are discussed in greater detail below.

The sections which follow describe various systems and processes that enable the creation and/or dissemination of a summary prospectus, and underlying detailed documents, in online and hard copy form. For example, Section II describes systems and methods for identifying a summary prospectus published by a securities issuer and/or intermediary (e.g., to EDGAR) and storing the summary prospectus in a document repository. Section III describes systems and methods for processing the summary prospectus to identify certain information contained therein, and to create logical associations between this information and more detailed information provided in underlying documents. Section IV describes systems and methods for using these logical associations to create references between sections of an online version of a summary prospectus and corresponding information in other documents, which may allow an investor to navigate between the online version and the underlying documents as desired. Section V describes how these systems and methods described in Sections II-IV may be used to disseminate a summary prospectus and/or online version thereof to investors and/or other parties.

II. Acquiring Compliance Information

Commonly assigned U.S. Pat. No. 6,122,635, entitled "Mapping Compliance Information Into Useable Format," filed Feb. 13, 1998, the entirety of which is incorporated herein by reference, discloses systems and methods which may be employed to acquire information from one or more databases (e.g., EDGAR), identify the information as comprising a statutory and/or summary prospectus document for a particular security, and create and store a computer-readable file containing the information for further processing. Relevant portions of the '635 patent are reproduced below for the reader's convenience.

A process 11 for acquiring, identifying and creating a computer-readable file representing compliance information (one example of which is a summary prospectus) is depicted in FIG. 3. Process 311 includes acquiring securities information from one or more database sources (Step 310). One or more portions of the acquired securities information is identified as being compliance information related to a particular security and extracted from the securities information (Step 312). A computer-readable file is then created which includes the compliance information (Step 314). This computer-readable file, identified as being the compliance information for a particular security, may then be stored and/or transmitted electronically to investors.

Figure 4:
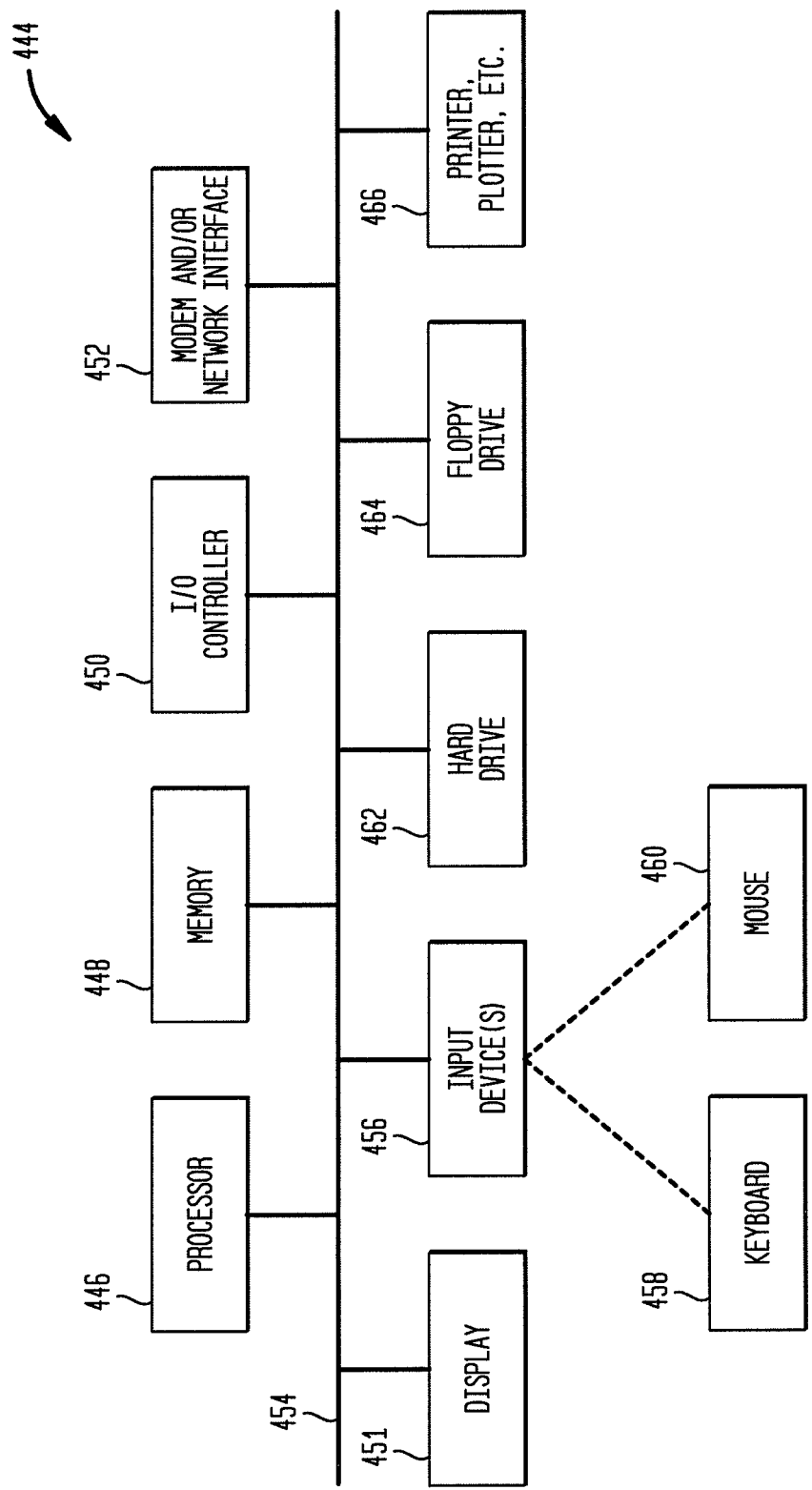
FIG. 4 is a block diagram of an example system for processing information, in accordance with some embodiments of the invention.

In one aspect of the invention, the method 311 shown in FIG. 4 is accomplished by one or more persons operating a programmed computer system. A block diagram of such a computer system is shown in FIG. 4. The computer may be implemented in any suitable manner, as the particular type and capabilities of the computer is not central to the invention. The invention may be implemented in a variety of ways, including an all-hardware embodiment in which dedicated electronic circuits are designed to perform all of the functionality that the programmed computer can perform. An example of the present invention is an implementation in software for execution on a general purpose computer such as a PC running a version of the Microsoft Windows® operating system.

Referring to FIG. 4, the general purpose computer 444 typically includes a central processor 446, a main memory unit 448 for storing programs and/or data, an input/output (I/O) controller 450, a display device 451, and a data bus 454 coupling these components to allow communication therebetween. The memory 448 generally includes random access memory (RAM) and read only memory (ROM). The computer 444 typically also has one or more input devices 456 such as a keyboard 458, and a mouse 460. The computer typically also has a hard drive 462 with hard disks therein and a floppy disk drive 464 for receiving floppy disks such as 3.5 inch disks. A data communications interface 452 such as a modem, an Ethernet card, or other network interface allows communication with other computers on a LAN, intranet or Internet. Other devices also can be part of the computer 444 including output devices 466 (e.g., printer or plotter) and/or optical disk drives for receiving and reading digital data on a CD-ROM. In the present invention, one or more computer software programs define the operational capabilities of the computer 444. These software programs may be loaded onto the hard drive 462 and/or into the memory 448 of the computer via the floppy disk drive 464 or the data communications interface 452.

Figure 5:
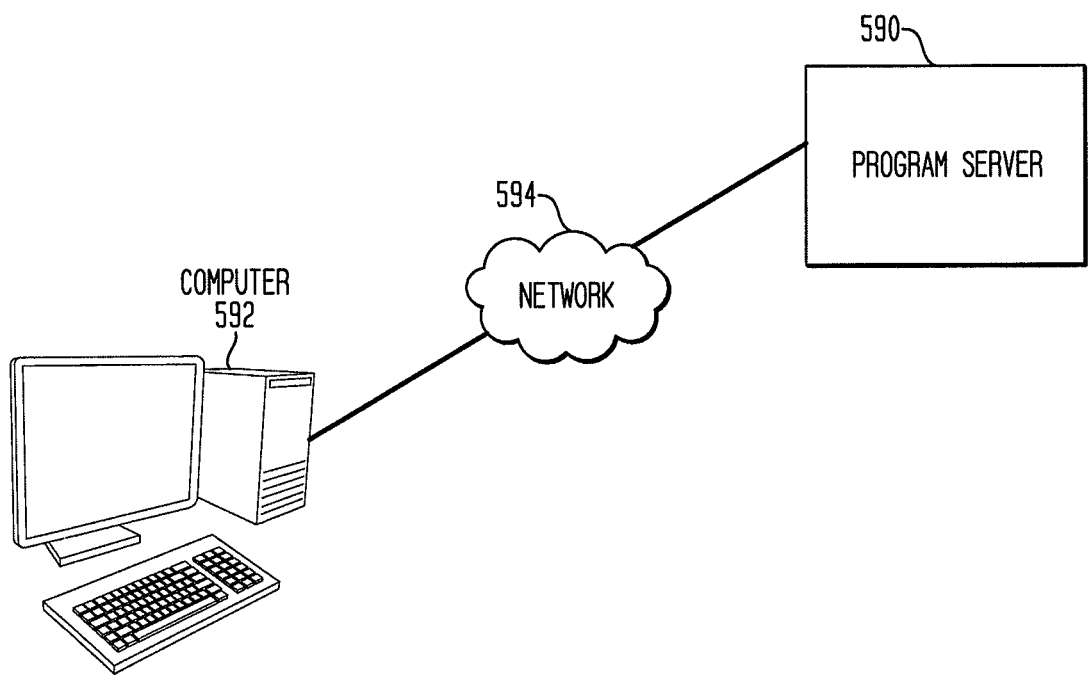
FIG. 5 is a block diagram of an example system for storing and retrieving information, in accordance with some embodiments of the invention.

Referring to FIG. 5, one aspect of the present invention includes a computer 592 connected to a network 594 via a data communications interface 552. Computer programs that implement an embodiment of the invention are stored on a program server 590, which is another computer, that can be implemented by a general purpose computer 444. Generally, the program server 590 has high performance components, such as a high speed processor 446 and hard drive 462, and a large amount of memory 448. The programs may be stored on the server 590 in, for example, HTML and Java languages. The computer 592 runs commercially available worldwide web browser software, such as Netscape Navigator® or Microsoft Explorer. The browser software downloads the HTML and Java programs from the program server 590, and executes the programs. The use of a network 594 and browser software makes the programs available to a large number of computers on the network simultaneously. This facilitates operation of the system by multiple users at the same time.

Figure 6:
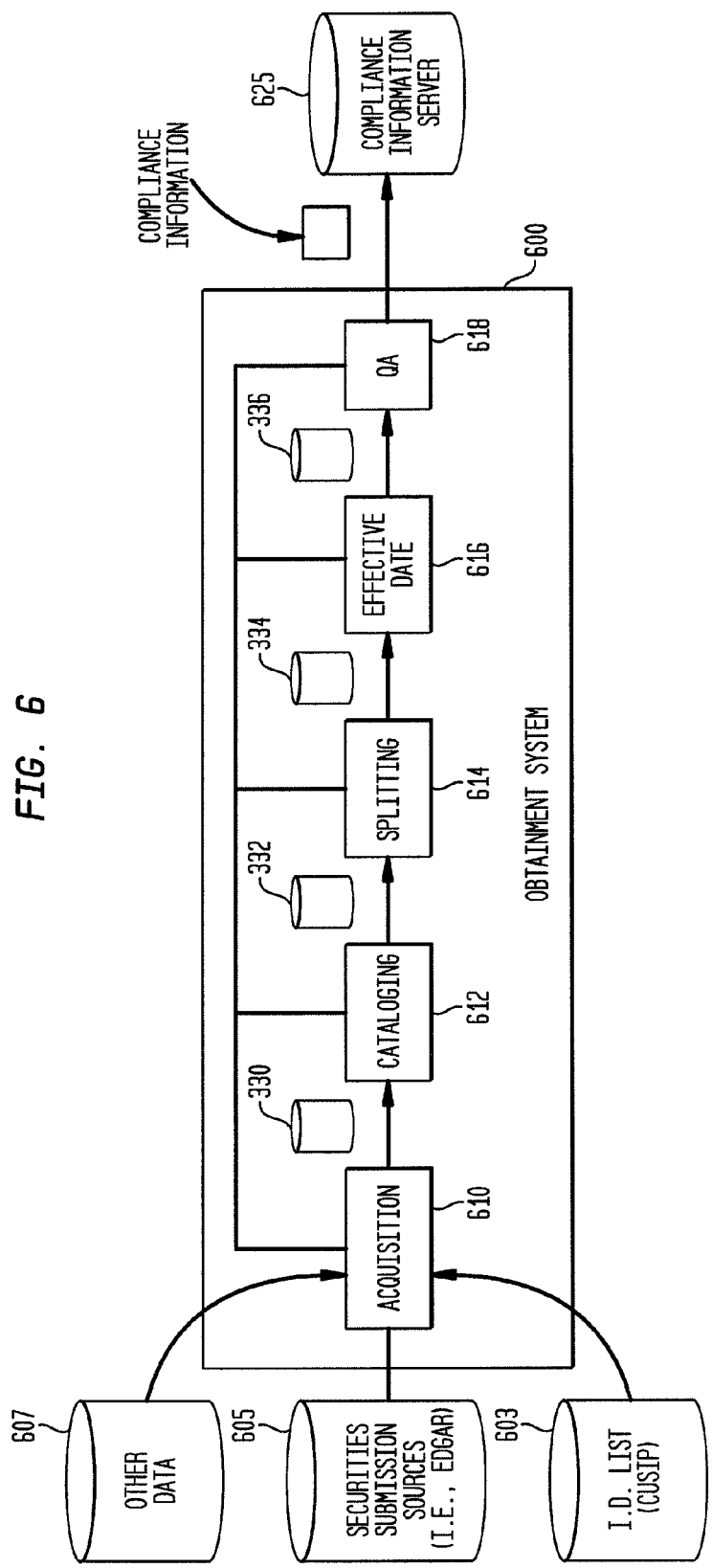
FIG. 6 is a block diagram of an example information obtainment and storage system, in accordance with some embodiments of the invention.

Referring to FIG. 6, one aspect of the present invention includes an obtainment system 600. Obtainment system 600 contains an acquisition subsystem 610, a cataloging subsystem 612, a splitting subsystem 614, an effective date subsystem 616, and a quality assurance subsystem 618. Obtainment system 600 receives input from an identification list 603, securities submissions sources 605, and other data sources 607. Obtainment subsystem 600 produces compliance information (e.g., a summary prospectus) that may be delivered to a customer, or stored in a compliance information database 625 for subsequent delivery to a customer.

The acquisition subsystem 610 receives input from the securities submission sources 605 and other data sources 607. The securities information acquired by acquisition subsystem 610 is placed on a cataloging queue 630.

Cataloging subsystem 612 retrieves the securities information from the cataloging queue 630 and catalogs it. The cataloging subsystem 612 also receives as input, the securities information from the cataloging queue 630, as well as identification list 603, and other data 607. After cataloging, the securities information is placed on the splitting queue 632.

The splitting subsystem 614 retrieves the securities information from the splitting queue 632. After the splitting subsystem 614 determines start and end points of each item of compliance information in an item of securities information, the securities information is placed on the effective date queue 634.

The effective date subsystem 616 retrieves the securities information from the effective date queue 634, and determines an effective date for each item of compliance information (e.g., a summary prospectus) in the securities information. The compliance information is then placed on the quality assurance queue 636.

The quality assurance subsystem retrieves the securities information from the quality assurance queue 636. The compliance information is reviewed in the quality assurance subsystem 618, and then output from the obtainment system 600.

Referring to FIGS. 5 and 6, a system operator uses the computer 592 executing a browser program to connect to program server 590. Upon connecting to the program server 590, the system operator chooses, or is assigned, a particular subsystem. The system operator chooses or is assigned items on the respective input queue for that subsystem and operates the subsystem to process the retrieved data.

By dividing the system 600 into multiple subsystems and queued input for each subsystem, the processing of the documents is divided up into sub-tasks. Multiple system operators can be assigned to one of the sub-tasks, and can therefore process securities information simultaneously. For example, if there are four system operators, the first system operator may process a first securities information document in the cataloging subsystem, a second system operator may process a second securities information document in the cataloging subsystem, a third system operator may process a third securities information document in the splitting subsystem, and a fourth system operator may process a fourth securities information document in the QA subsystem. Using multiple system operators allows for rapid processing of securities submissions through the system.

Acquisition subsystem 610 extracts files from the securities information source that contain securities information relevant to the subset of securities for which the user desires compliance information according to a process as shown in FIG. 7. In one aspect of the present invention, the securities submission source is queried to extract all the files associated with a particular company, step 702. The particular company may be determined by its central index key or by the company name. Because this may not be the first access for that particular company, the sources are compared to the information that is already in the database that is part of the system, so that the same document is not acquired twice, step 704. The subsystem thereby acquires submissions regarding securities that the user is interested in and that have not been previously processed, step 706. The acquisition subsystem, step 708, associates the retrieved securities filing documents with the particular company and then the acquisition subsystem passes the submissions to the cataloging subsystem 612.

As part of its service, EDGAR provides an index to the securities information added each day. In one aspect of the present invention, the acquisition subsystem 610 automatically acquires those documents that were added that day. The EDGAR index lists a central index key associated with each item of securities information. Acquisition subsystem 610 uses the EDGAR index to acquire the most recent information for a specific list of central index keys, step 710. The list of central index keys is determined from a list of securities, each of which has a unique identifier. For example, a list of securities identified by CUSIP number or stock ticker symbol may be mapped into a list of central index keys. Specific entries in the EDGAR index are identified, step 712, and then retrieved, step 714. The process then proceeds to step 708 as described above.

The cataloging subsystem 612 presents the system operator with the securities submissions that are relevant. The system operator inspects each submission and catalogs it according to the information contained within. Each submission may contain several items of compliance information. The system operator identifies the particular securities about which the submission contains compliance information.

Another aspect of the present invention scans the submission taken from the cataloging queue and searches for and identifies possible references to securities within the submission. The operator would then be directed to the locations of these identified securities within the submission in order to verify.

Any one or more of an internal identification number, CUSIP identifiers and stock ticker symbol may be used to identify a particular security. The internal identification number is unique for each security. A CUSIP number is a number assigned by Standard & Poor's CUSIP Service Bureau, the manager of the American Banking Association's CUSIP number system, to identify a security. A stock ticker symbol is a symbol assigned by a stock exchange to identify a security. An investor is most likely to reference a security, such as a mutual fund, by any one of: the fund name marketed to the consumer, the CUSIP number, or the stock ticker symbol, and not by the investment company name or the central index key.

For example, a section 800 of securities information acquired from the SEC EDGAR database is shown in FIG. 8. The section 800 may include a company data portion 802 including a company name 804, a central index key 806, an IRS number 808, an address 810 and, if applicable, former company name(s) 812. The company data indicates the source of the submission (not shown), but does not necessarily specify the securities described in the submission. A particular investment management fund may have one to hundreds of funds, and information about all or some subset of those funds may be in one or more particular EDGAR submission.

Figure 9:
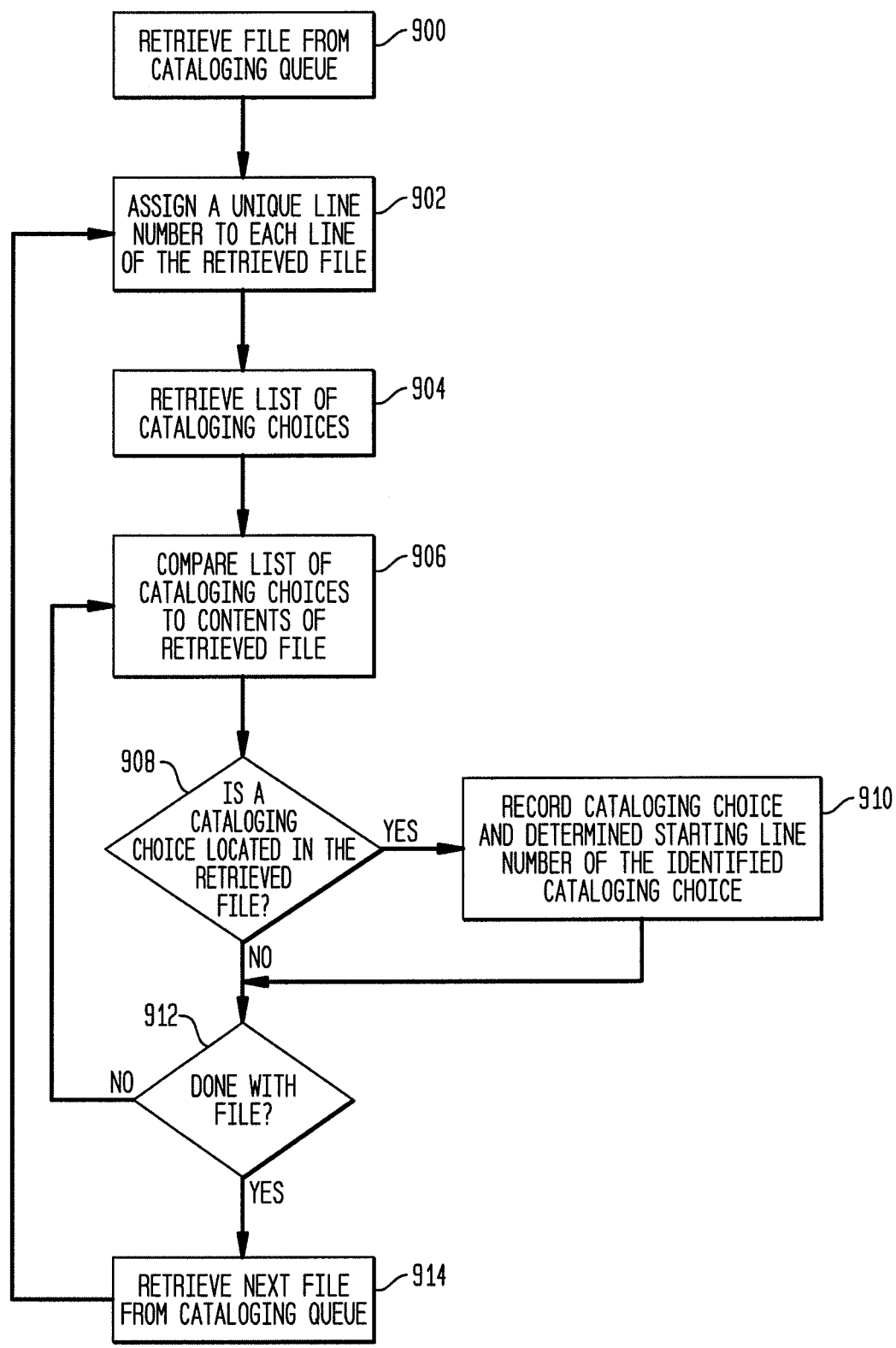
FIG. 9 is a flowchart of an example method for retrieving information, in accordance with some embodiments of the invention.
Figure 10:
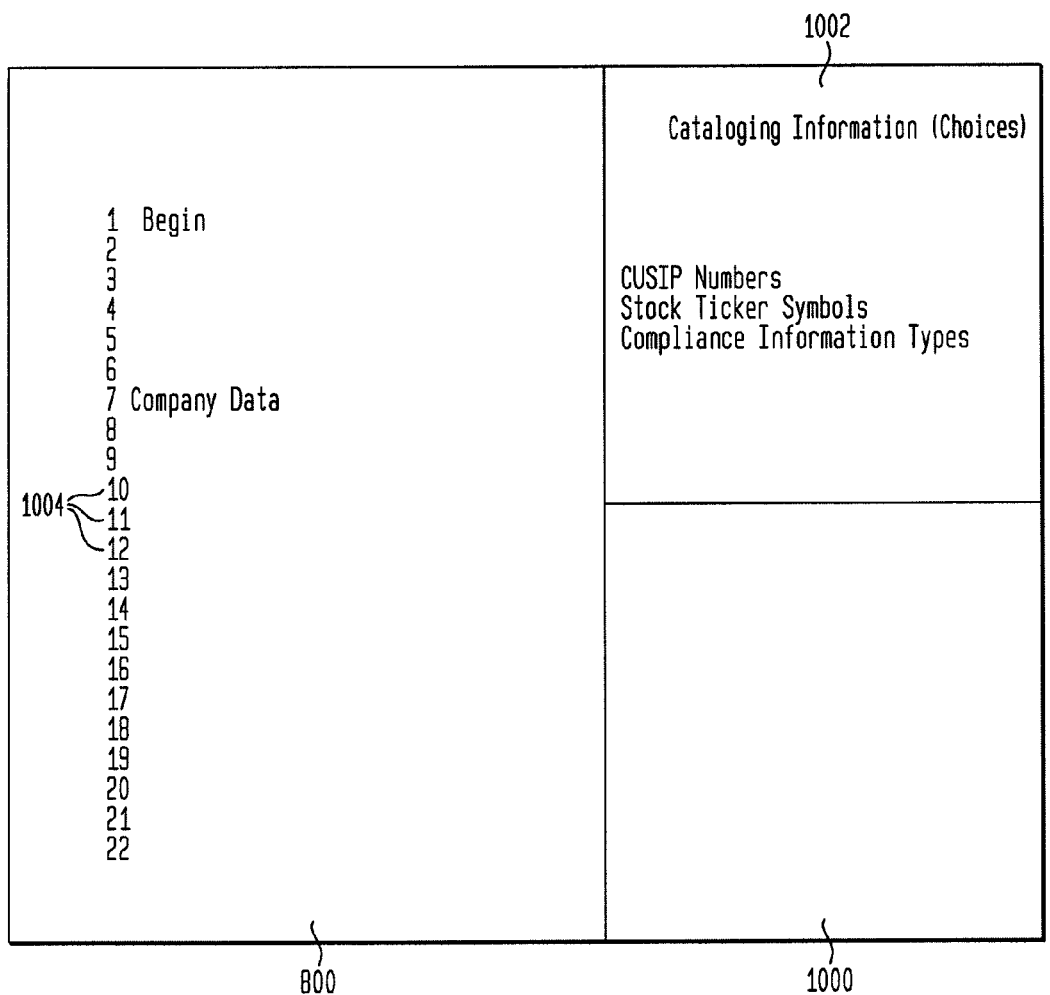
FIG. 10 is a representation of an example interface displaying retrieved information, in accordance with some embodiments of the invention.

Operation of one example of a cataloging subsystem 612 is presented in FIG. 9. A securities submission from the cataloging queue 630 is presented to a system operator and retrieved at step 900. In one example of operation, as shown in FIG. 10, the securities submission portion 900 may be visible in one section of a display screen 1000 cataloging information 1002 may be visible on another section. A unique line number 1004 is assigned to each line of the securities submission 900 at step 902. The securities submission is not permanently modified to include the line numbers, rather, the line numbers are shown only for the purpose of aiding in the cataloging and extracting of the compliance information.

The cataloging section 1002 of the screen 1000 presents a list of cataloging choices as retrieved in step 904. Cataloging choices include possible CUSIP numbers or stock ticker symbols, the type of compliance information contained in the document (for example prospectus, statement of additional information (SAI), etc.), and the start line of each item of compliance information. As the system operator reviews the securities submission, the system operator selects the appropriate cataloging choices.

The operator, aided by the cataloging subsystem, compares the list of cataloging choices to the contents of the retrieved file, step 906. If a cataloging choice is located in the retrieved file, step 908, control passes to step 910. At step 910, the line number associated with the start of the identified cataloging choice is recorded. If the processing of the file is not complete, as determined in step 912, the process returns to step 906. If the file has completed processing, at step 914, a next file is retrieved from the cataloging queue and the process returns to step 902.

The splitting subsystem 614 determines the starting line and ending line of the compliance information that the system will use to extract compliance information from the securities submissions documents. For example, if the submission contains two SAIs, each for a different security, the starting and ending lines of the two items of compliance information will be associated with their respective security. The splitting subsystem presents the system operator with the securities submission and the catalog data for that submission. The system operator verifies the starting line and specifies the ending line of each item of compliance information. When the starting and ending line numbers of compliance information in the securities submission have been identified, the securities submission is then placed on the effective date queue.

In one embodiment, the splitting subsystem 614 is accessed at least two times for each securities submission by two different system operators. The starting and ending line numbers identified by the two system operators are compared in the quality assurance subsystem to confirm accuracy.

In one example of the system, the splitting subsystem 614 also determines whether the compliance information relates to, or is associated with, more than one security. For example, for a bundled product such as a variable annuity fund, an EDGAR filing may be related to more than one investment product. One item of compliance information may be applicable to many different investment products. This association, as determined in the splitting subsystem, is used later to associate the compliance information with the relevant securities. Alternatively, in other versions of the system, this association may occur in the cataloging subsystem 612, or the effective date subsystem 616.

Figure 11:
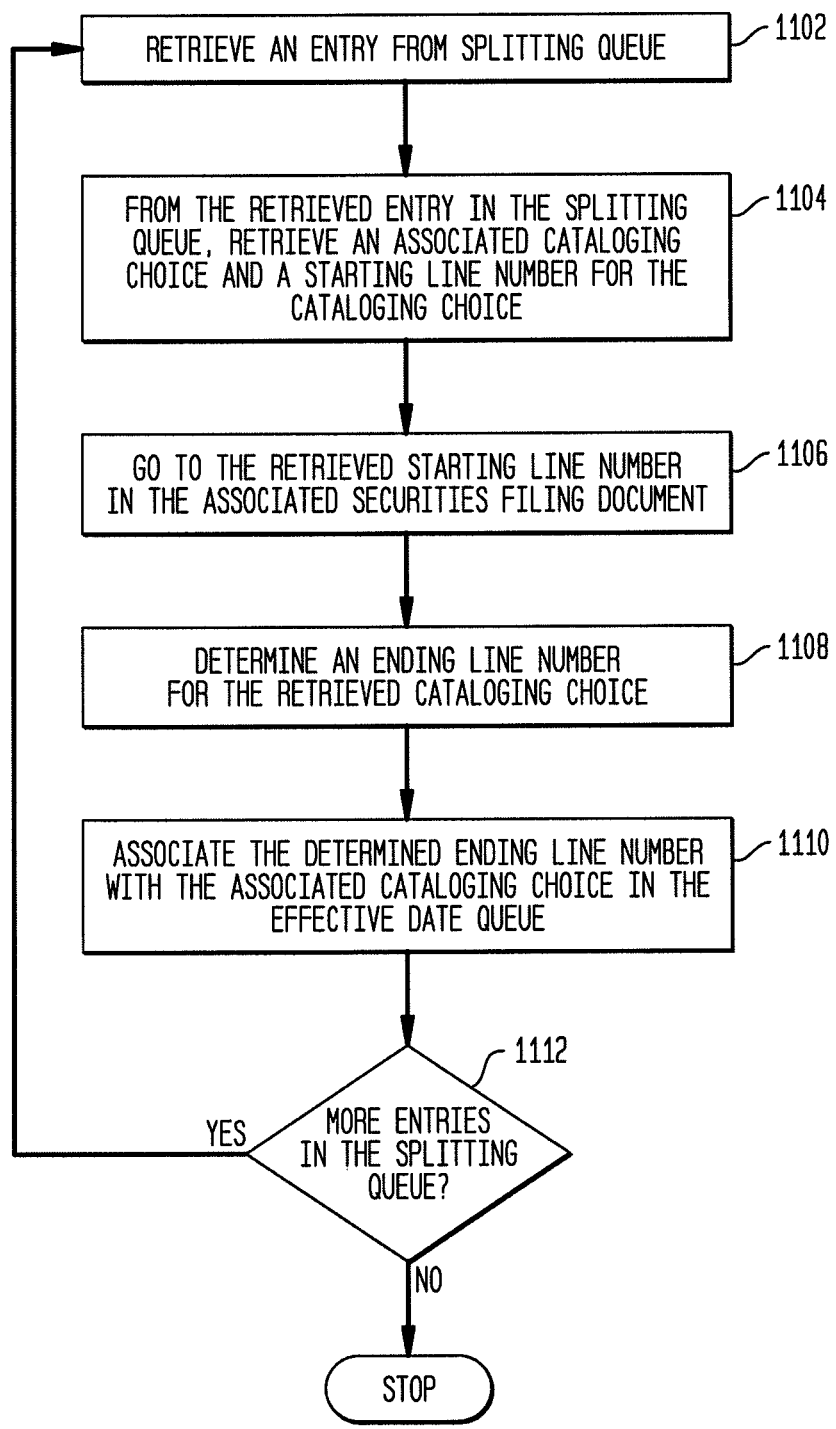
FIG. 11 is a flowchart depicting an example method for identifying an item of information for cataloging, in accordance with some embodiments of the invention.

Operation of one example of the splitting subsystem 614 is presented in FIG. 11. An entry from the splitting queue is retrieved at step 1102. An associated cataloging choice and a starting line number for the cataloging choice are retrieved from the entry in the splitting queue, step 1104. That portion of the associated securities filing document including the retrieved line number is accessed, step 1106. An ending line number for the retrieved cataloging choice is determined at step 1108. The determined ending line number is associated with the associated cataloging choice in the effective date queue at step 1110. At step 1112, it is determined whether or not there are more entries in the splitting queue to be processed. If there are more entries to be processed, control returns to step 1102 to process the next entry, otherwise the process is stopped.

Figure 12:
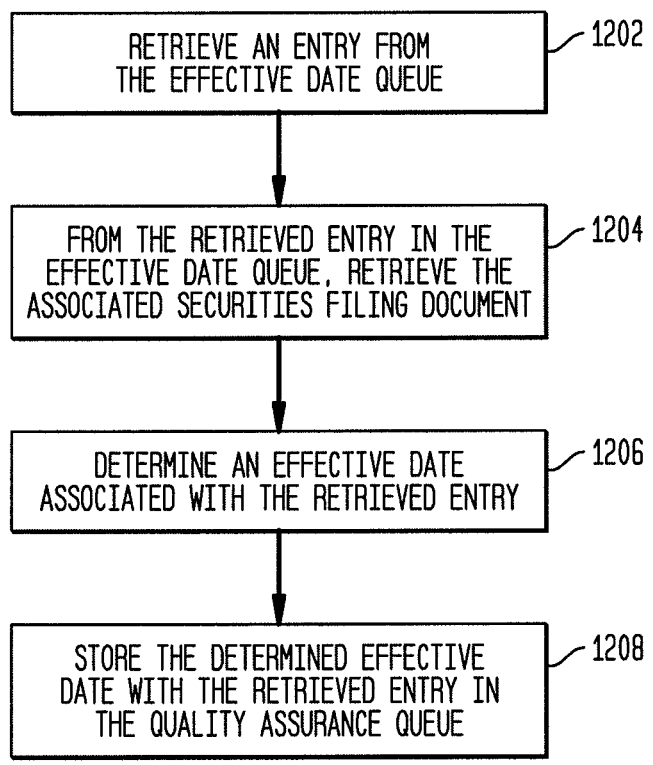
FIG. 12 is a flowchart depicting an example method for identifying and/or assigning an effective date for an item of information, in accordance with some embodiments of the invention.

As shown in FIG. 12, the effective date subsystem 616 supports a determination of an effective date of the documents produced by the cataloging process. The system operator retrieves a file from the effective date queue, steps 1202, 1204, and determines the respective effective date of the information therein. If the system operator cannot determine the effective date, but the compliance information has been determined to be a prospectus, and the system operator can determine the filing type, filing date and the prospectus date, then the system operator can determine the effective date, step 1206, through knowledge of applicable filing requirements and features built into the system, such as an automatic obsolescence feature that relates to the age of the document. After the effective date has been determined, the securities submission and its associated effective date are associated and placed on the quality assurance queue, step 1208.

The effective date is determined based on the type of securities submission. For example, if the securities submission contains a 497 or 485BPOS filing, then the prospectus date is generally the effective date. If the document is a 485APOS filing, then the filing date is the "Filed As Of Date." The effective date is generally either the prospectus date or the filing date plus sixty days, whichever is later. If the prospectus registers a new series of stock, however, then the effective date is either the prospectus date or the filing date plus seventy-five days, whichever is later. If the prospectus date is incomplete, for example "Jan. _____, 2008," the operator can use his or her knowledge of applicable filing requirements to determine the effective date. For 497 and 485BPOS filings, for example, the filing date is the effective date, and for 485APOS, the effective date is sixty days after the filing date, unless it is registering new shares, in which case the effective date is seventy-five days after the filing date.

In one version of the system, the effective date subsystem 616 also determines if the compliance information is amending another item of compliance information. If it is an amendment, the compliance information is effective when the compliance information it is amending is effective. The effective date system sets the effective lifespan, i.e., a date the compliance information is effective and a date that it is no longer effective, to that of the amended compliance information. There are other relationships between submission types and effective dates that may be used to determine the effective date of a document being used as the basis for compliance information.

Figure 13:
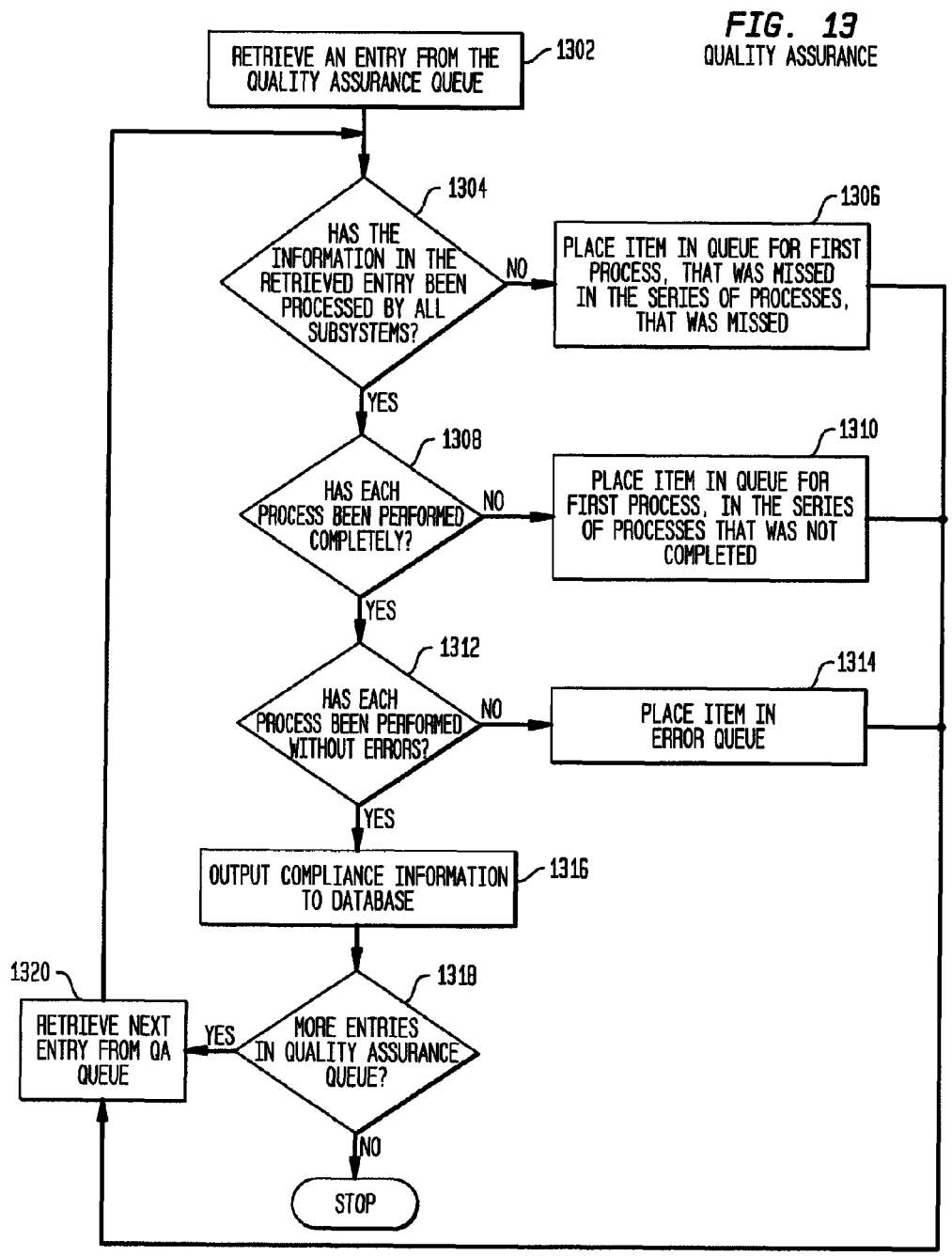
FIG. 13 is a flowchart depicting an example method for assessing the quality of an item of processed information, in accordance with some embodiments of the invention.

The quality assurance subsystem 618 is the final subsystem in the chain before the compliance information is output from the obtainment system. The quality assurance subsystem 618 aids an operator in the inspection of the compliance information. The system operator chooses, or is assigned, an item from the quality assurance queue, step 1302, as shown in FIG. 13. The system operator verifies, step 1304, that the securities submission referenced in the retrieved item has been processed by all subsystems. If not, at step 1306 the item is placed in the queue for the first subprocess that was missed. The system operator verifies that the catalog information is correct, and verifies the effective date, the document type, the issuer, the fund, the class, whether the document is complete, whether there is extra data, whether the document is properly formatted, as well as any other relevant information.

In the example in which the splitting subsystem 614 is accessed twice independently, the quality assurance system may compare the starting and ending lines specified by the previous two splitting subsystem 614 system operators for each item of compliance information. If any of the information for the retrieved item is not complete, step 1308, the system operator may place the securities submission on any of the queues for processing by a subsystem, step 1310. Of course, if the analysis determines that the processing should be repeated in more than one subsystem, the quality assurance system operator may choose to place the securities submission in the most "upstream" subsystem's queue. Once the system operator has verified that the compliance information will be extracted correctly, the extraction takes place and the compliance information is output from the obtainment system 600.

Extraction involves copying information from the securities submission document as a function of the starting and ending lines determined within the obtainment system 600 as described above. Of course, the same portion of the securities submission document may be retrieved as relevant to different securities. Each security would then have its own respective compliance information document.

If, as determined at step 1312, an error occurred during processing by any of the subsystems, for example if a securities submission does not contain necessary information, then the securities submission is placed on the error queue, step 1314. A system operator may look at the securities submissions that have been placed on the error queue at a later time to solve the problems encountered.

Once output from the obtainment system, the compliance information may be stored in a file system on either computer 592 or program server 590, step 1316. The compliance information may also be stored in a compliance information server 625. At step 1318, if it is determined that there are more entries in the quality assurance queue, control passes to step 1320 where the next entry from the queue is retrieved. The process then starts again at step 1304.

In one example, the compliance information server 625 may include a document processor for converting the compliance information from its native format, for example ASCII text or HTML format, into another format, for example into Microsoft Word® or Adobe Acrobat® format. Of course, the compliance information, once extracted, may be kept in the source format as the original financial submission. The compliance information is then stored.

In one example of the present invention, the compliance information server 625 is incorporated into the same machine as the obtainment system 600. In this case a system for providing access to compliance information would include obtainment system 600 and an accessing system that incorporated compliance information server 625. In another embodiment the compliance information server 625 is a separate server from the obtainment system 600.

Figure 14:
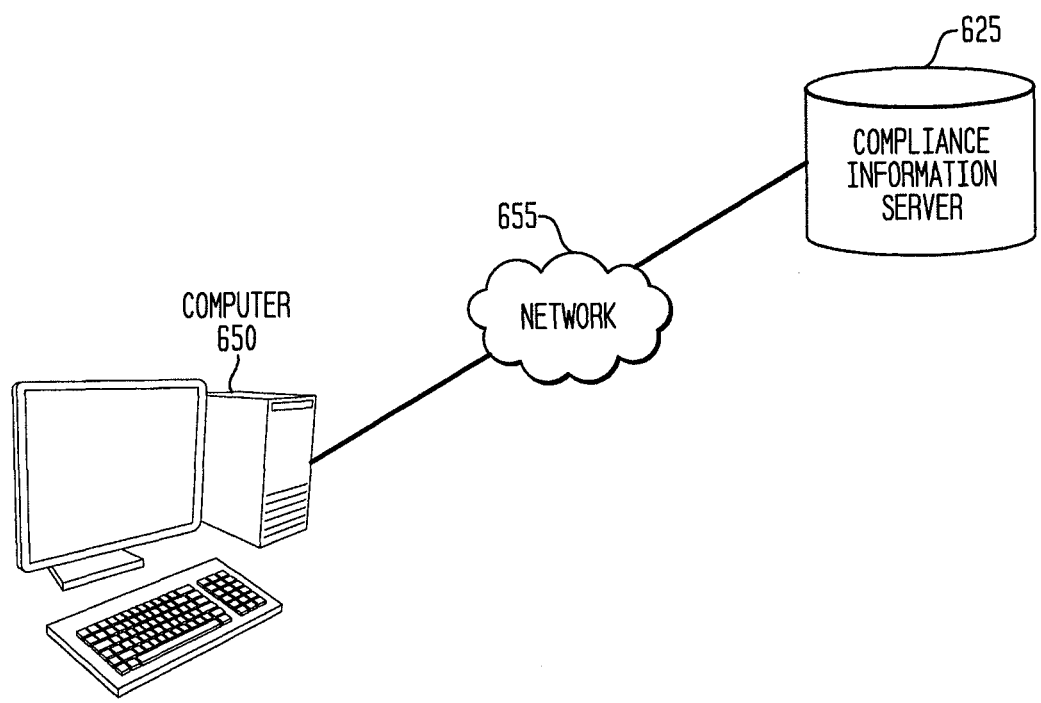
FIG. 14 is a block diagram of an example system for storing and retrieving items of compliance information, in accordance with some embodiments of the invention.

Referring to FIG. 14, a compliance information server 625 is shown connected to network 655. Client computer 650 running browser software may access the compliance information server via the network to retrieve the compliance information. The compliance information server makes the compliance information available over a network, such as a LAN, intranet or the Internet. In another example, the compliance information server 625 distributes the compliance information directly to a user or specified group of users via the network. In yet another example, the compliance information server notifies users when new compliance information has become available at the server by sending a message over the network.

The compliance information server 625 has access to the compliance information as well as the catalog information about the particular security associated with the compliance information. For example, all of the compliance information for a particular security may be listed. Because the compliance information server has the information that was entered by the system operator when the document was processed by the cataloging subsystem, all the compliance information for a particular security may be accessed either by the name of the security as it is marketed to the customer, the CUSIP number of the security, or the stock ticker symbol of the security.

Figure 15:
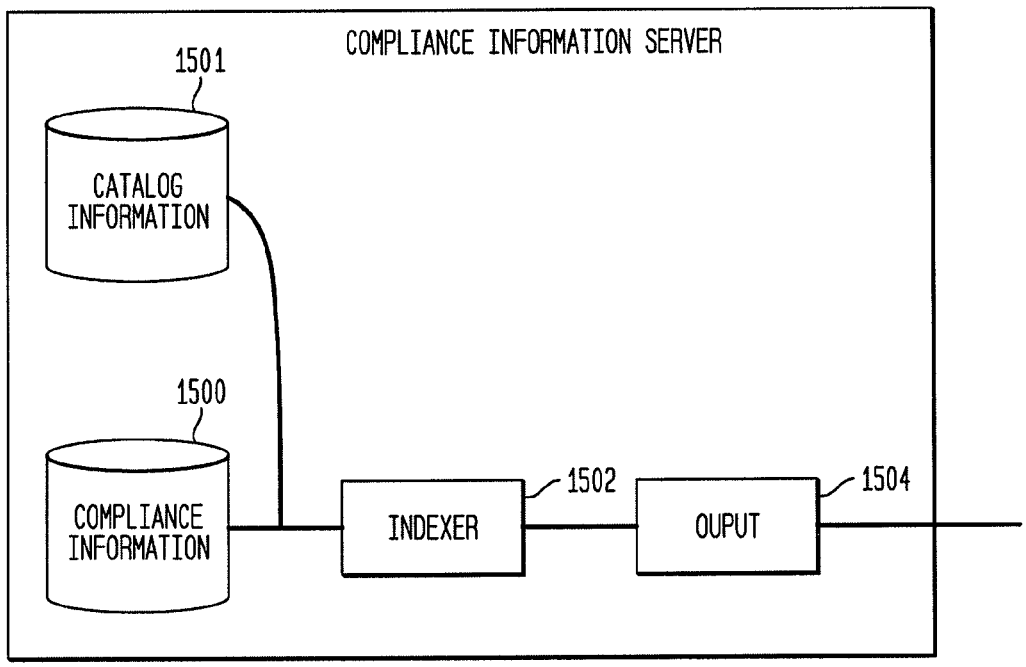
FIG. 15 is a block diagram of an example compliance information server, in accordance with some embodiments of the invention.

Referring to FIG. 15, one example of a compliance information server includes compliance information, an indexer, and an output. The compliance information is stored on a hard disk 1500, but it also may be stored on other media, in memory, or on another system that the compliance information server has access to over the network. The compliance information includes the compliance information produced by obtainment system 600. Compliance information server 625 also includes catalog information produced by system operators using obtainment system 600. An indexer 1502 accesses the compliance information and the catalog information and identifies all compliance information associated with a particular security. Alternatively, indexer 1502 does not use the catalog information 1501, but instead searches each item of compliance information 1500 to determine the particular security with which it is associated. Indexer 1502 may keep a list of the compliance information stored on hard disk 400 to increase the speed of production of a list of all compliance information associated with a particular security.

A request to compliance information server 625 may come in the form of a unique identifier for the security, such as an internal identifier, a CUSIP number or a stock ticker symbol. The indexer identifies the compliance information associated with that unique identifier. The compliance information server may output a list of the compliance information documents that are available. Alternatively, it may output the compliance information. In one example, the compliance information server receives a request for a list of all the information for a particular security. The request is in the form of a request for a web page. In response, the compliance information server 625 outputs a list of the compliance information. The list is in the form of a worldwide web page that contains links to each of the items of compliance information. The worldwide web page may also contain links to other information about that security.

Figure 16:
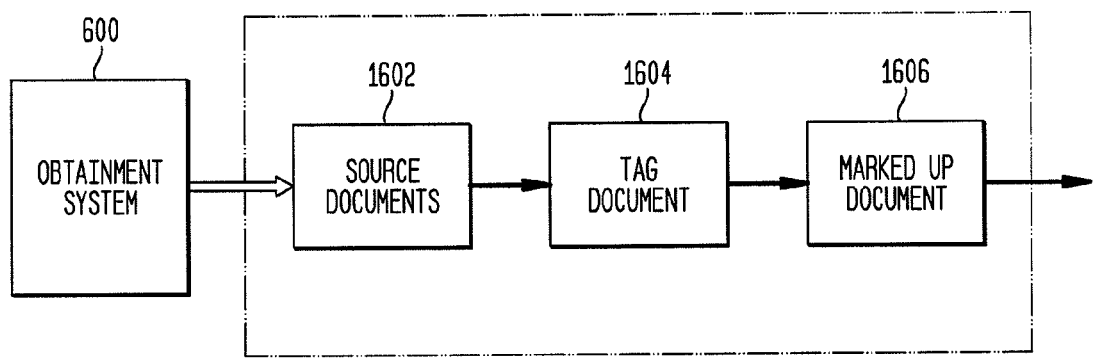
FIG. 16 is a flowchart of an example method for responding to requests for compliance information, in accordance with some embodiments of the invention.

Referring to FIG. 16, a method for responding to requests for compliance information includes receiving a unique identifier (step 1650). The unique identifier may be a unique internal identifier, a CUSIP number, or a stock ticker symbol. The method may also include transmitting compliance information in response to receipt of the unique identifier (step 1652). The compliance information server is capable of accomplishing the steps of the method because the compliance information server has the compliance information and it can associate the compliance information with the particular security specified by the unique identifier.

It should be appreciated that the foregoing description with reference to FIGS. 3-16 discloses a capability to either identify a summary prospectus made available by a securities issuer as being related to one or more particular securities and extract the summary prospectus (e.g., from a larger body of data representing a full statutory prospectus for the one or more securities), or to identify a full statutory prospectus as being related to the one or more securities from which a summary prospectus may be created. In either case, one or more computer-readable files containing extracted information may be created and stored (e.g., in a repository containing other computer-readable documents relating to the one or more securities), which may then be processed as described in the following sections to either identify individual data elements within a summary prospectus made available by a securities issuer, or to create a summary prospectus from a full statutory prospectus by identifying certain key data elements within the statutory prospectus and copying or extracting them to a summary prospectus.

III. Identifying Data Elements Provided Within Compliance Information

Commonly assigned U.S. patent application Ser. No. 10/135,834 discloses systems and methods which may be employed to identify one or more particular data elements within a computer-readable file containing summary prospectus information (which may be identified using the system described above in Section I) and to insert markers into the computer-readable file indicating the presence of this data. Using this system (as an example), individual sections of a summary prospectus document, and various data elements included in each section, may be identified, enabling the creation of an online version of the summary prospectus.

Commonly assigned U.S. patent application Ser. No. 10/821,121, filed Apr. 8, 2004, entitled "System For Locating Data Elements Within Originating Data Sources," the entirety of which is incorporated herein by reference and relevant portions of which are reproduced below, discloses techniques for employing these markers to create logical associations between information included in various documents. Using these techniques, for example, a summary and statutory prospectus made available by a securities issuer may be processed to insert references (e.g., links) into sections of an online version of the summary prospectus to enable an investor to navigate from the sections of the online version to underlying detailed information provided in the statutory prospectus. In another example, these techniques may be used to process a statutory prospectus, identify certain key data elements contained within, and generate a summary prospectus to include these key data elements and references from sections of the summary prospectus containing one or more of the data elements to portions of the statutory prospectus providing more detailed information regarding the data element(s).

Some embodiments of the invention provide a capability to analyze one or more underlying documents (e.g., a statutory prospectus) to identify the location(s) within the document(s) at which detailed information corresponding to high-level information provided in a summary prospectus is found. Once the location(s) are identified, references may be created to corresponding detailed information. Portions of the information at the identified location(s) may be used to generate a summary prospectus, and the references may be inserted into the appropriate sections of the online version of the summary prospectus, so as to enable investors to readily navigate between high-level information in the summary prospectus and supporting detailed information contained in other documents. Alternatively, if a summary prospectus is made available by a securities issuer along with a corresponding statutory prospectus, references to portions of the statutory prospectus may be inserted into sections of the summary prospectus to enable investors to navigate between the high-level information in the summary prospectus and the supporting detail in the statutory prospectus.

An example process for inspecting a document to identify the location(s) at which information is found is depicted in FIG. 16. In some embodiments, output from obtainment system 600 (e.g., summary prospectus information obtained from EDGAR, as well as other documents providing underlying detailed information) is provided as source documents in 1602. In 1604, the document(s) are tagged, resulting in a tagged document in 1606. The tagged document may enable tagged information therein to be retrievable, as described below.

The identification of individual data items so that they may be tagged is described in greater detail with reference to FIGS. 17 and 18. Specifically, FIG. 17 depicts a process for identifying individual data items, and FIG. 18 depicts a system for performing the method of FIG. 17.

Figure 17:
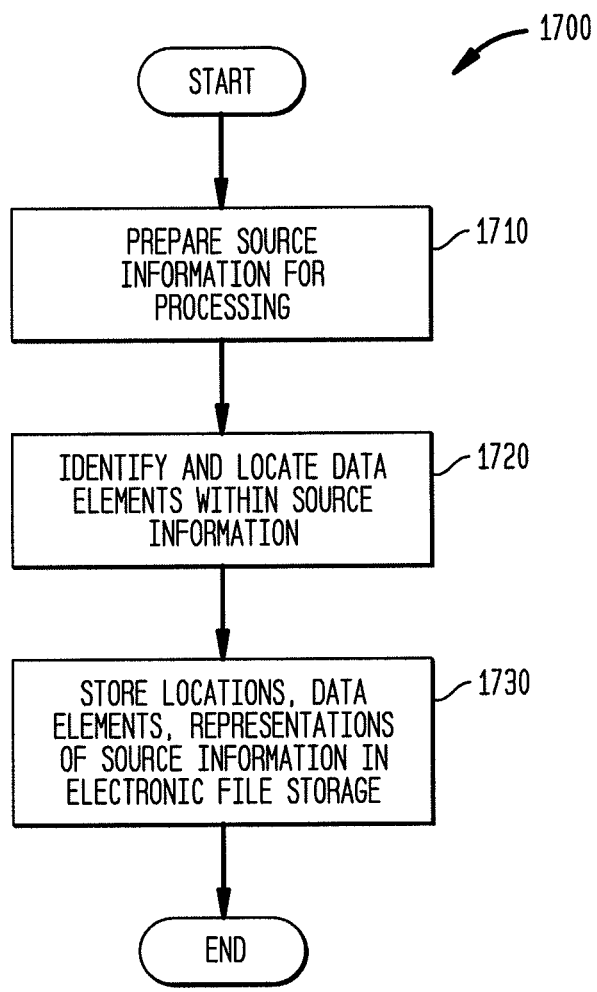
FIG. 17 is a flowchart of an example method for identifying and locating a data element, in accordance with some embodiments of the invention.
Figure 18:
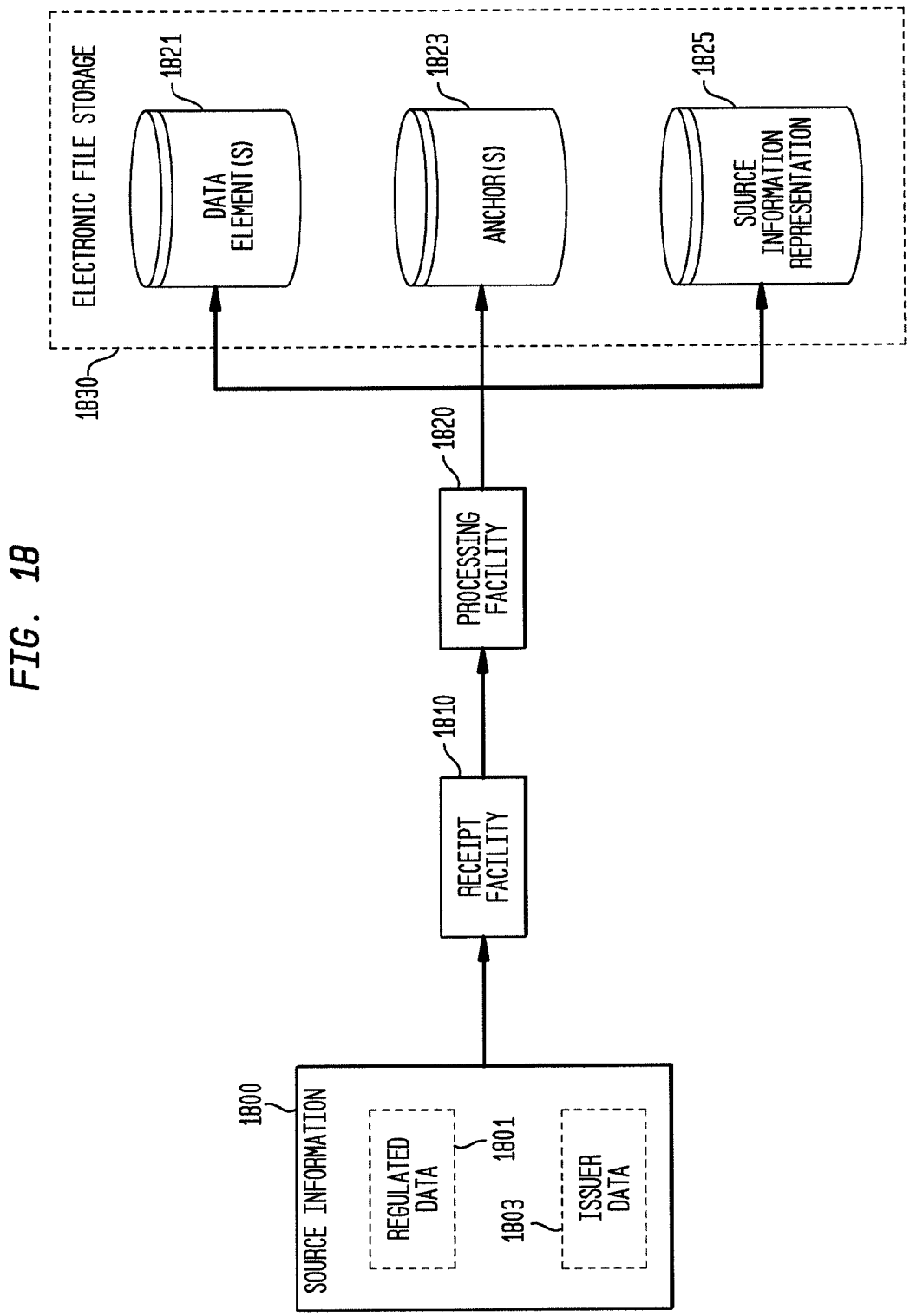
FIG. 18 is a block diagram depicting an example system for identifying and locating a data element within source information, according to some embodiments of the invention.

At the start of the process of FIG. 17, in act 1710, a receipt facility 1810 performs a preliminary identification of source information 1800. For example, in an embodiment wherein source information 1800 comprises a security filing, receipt facility 1810 may identify the type of filing, the issuer, the relevant security(ies), and/or other information. This may be performed in any suitable fashion. For example, receipt facility 1810 may scan the source information 1800 and compare data found therein with one or more data structures containing listings of the known types of filing, securities, issuers, and/or other data. Upon the preliminary identification of source information 1800 by receipt facility 1810, act 1710 completes.

The process then proceeds to act 1720, wherein one or more specific data elements are located within the source information 1800. In some embodiments, identification is performed by processing facility 1820, which performs the identification and location using output received from receipt facility 1810, as well as input provided by a human user. Specifically, in some embodiments, processing module 1820 receives output from receipt facility 1810 which defines, based on the preliminarily identification performed by receipt facility 1810, the type of source information 1800. Processing facility 1820 uses this information to access one or more of a collection of data structures (e.g., flat files) which each contain one or more encoded parameters that are descriptive of data elements commonly found within the source information. Processing facility 1820 utilizes the encoded parameters to locate the data elements within the source information. Once a data element has been located in the source information, processing facility 1820 issues a prompt to a human user via a graphical user interface (GUI) to confirm that the data element has been correctly identified.

In some embodiments, encoded parameters are provided as text within a data structure. One or more data structures may collectively represent a "taxonomy" for a specific type of source information interpreted by processing facility 1820. Specifically, a taxonomy may define the characteristics of each of the data elements commonly found within the considered type of source information. A taxonomy may define data element characteristics for any type of source information. For example, a taxonomy may define characteristics of data elements within a type of securities filing from all issuers (e.g., all mutual fund prospectuses), all filings from a specific issuer, all filings from all issuers, or any other suitable grouping of source information. Further, more than one taxonomy may be applicable to a specific type of source information. The invention is not limited in this respect.

A taxonomy may include one or more descriptive characteristics for each data element to be identified within the source information. For example, a taxonomy for a mutual fund prospectus might provide parameters defining descriptive characteristics for a "portfolio manager" data element as it appears within a fund prospectus. For example, a parameter for the portfolio manager data element may indicate that this data element is normally accompanied by the text "portfolio manager" within the source information. Any of numerous descriptive characteristics may be provided as a parameter for a data element within a taxonomy. For example, a parameter may indicate that a specific data element is normally accompanied by specific text (as with the example provided above), is normally found at a specific location within the source information (e.g., at the end of the document, or at the top of a page), normally receives a specific graphical treatment (e.g., is provided in a specific font, as an icon, and/or in a specific color), or otherwise conforms to a rule regarding its appearance or presence within source information.

A taxonomy may include more than one parameter for a specific data element. For example, a taxonomy for a fund prospectus may contain a first parameter for the portfolio manager data element which indicates that it is normally accompanied by the text "portfolio manager," a second parameter which indicates that it is normally found at the top of the second page of the prospectus, and a third parameter which indicates that it is provided in a specific font. Further, a taxonomy may specify which of these parameters must be satisfied in order for the data element to be identified. For example, a taxonomy may specify that only the first and second of the above-listed parameters must be satisfied to identify the portfolio manager data element, that all three parameters must be satisfied, that only one must be satisfied, or any other suitable combination of these parameters. The invention is not limited to a particular implementation in this respect.

In one embodiment, processing facility 1820 loads one or more taxonomies to memory and implements the encoded parameters therein as it processes the source information. In one embodiment, as the processing facility 1820 reads the source information it compares the characteristics of the source information with characteristics represented in the parameters. As in the example provided above, the taxonomy for a specific type of source information may contain a parameter which indicates that the presence of the text "portfolio manager" within that source information indicates the presence of the portfolio manager data element. As the processing facility 1820 reads the source information and compares its characteristics with those reflected by the parameters, upon encountering the text "portfolio manager" in the source information the processing facility may determine that the condition set forth by a parameter is satisfied, and identify the portfolio manager data element within the source information.

In some embodiments, a taxonomy may specify that a data element is accompanied by specific text or the equivalent of that text in any of several languages. For example, a taxonomy may specify that a portfolio manager data element is accompanied by the text "portfolio manager," or the equivalent to "portfolio manager" in French, Spanish, Russian, Chinese, Japanese or any other language. Each of these equivalents to "portfolio manager" may simply be encoded as individual parameters within the taxonomy itself, or processing facility 1820 may be configured to translate text into one or more other languages as needed. In this respect, it should be appreciated that text used to identify a data element need not be provided in English characters, and may be provided in Cyrillic, Arabic, Japanese, Chinese or any other suitable characters.

As discussed above, a taxonomy need not identify a data element by specifying text that normally accompanies the data element. A taxonomy may specify any attribute of a data element, such as its placement within source information, graphical treatment, or any other suitable attribute. Further, a taxonomy need not identify a data element using a single characteristic, as it may do so using a combination of characteristics, only a subset of which may need to be satisfied to identify the data element. As a result, processing facility 1820 may perform one or more logical operations to evaluate a combination of characteristics to identify a data element. For example, a taxonomy may specify that two characteristics must be satisfied for a specific data element to be identified. As a result, processing facility 1820 may scan the source information to determine that both characteristics are satisfied before identifying the data element. In another example, a taxonomy may specify that two of a group of three characteristics must be satisfied, in which case processing facility 1820 may perform logical operations commensurate with this identification criteria. Any combination of logical operations, involving any combination of characteristics, may be performed to identify a data element, as the invention is not limited in this respect.

As discussed above, upon preliminarily identifying a data element in source information, processing facility 1820 may prompt a human user to confirm that the data element has been correctly identified. The process by means of which a human user interacts with the process to confirm the identification of one or more data elements is described in further detail below. However, with respect to the function of a taxonomy, it should be noted that a response received from a human user as to whether a data element has been correctly identified may be used to update the taxonomy. For example, if a taxonomy fails to correctly identify a portfolio manager data element within source information, perhaps because the text "portfolio manager" accompanies information other than the portfolio manager data element, then the user's input indicating that the portfolio manager data element has not been correctly identified may be used to update the taxonomy. For example, a GUI may prompt the user to manually identify the portfolio manager data element within the source information, and prompt the user to provide one or more characteristics defining the correct portfolio manager data element. For example, the GUI may enable the user to specify that the correct portfolio manager data element is, in fact, accompanied by the text "portfolio manager" (e.g., it may be one of many components of the source information which is accompanied by that text) but also that the portfolio manager data element is found at the top of a page within the source information, is given a specific graphical treatment, or is identifiable in some other manner. In another example, the GUI may enable the user to specify that the portfolio manager data element is not accompanied by the text "portfolio manager," but rather the text "investment manager." In this manner, interaction with the user may allow the taxonomy to flexibly adapt over time in accordance to changes to source information, such as changes to format and/or content of source information initiated by securities issuers.

Even if a taxonomy correctly identifies a data element, a user's input may be useful for keeping the taxonomy in conformance with the characteristics of source information. For example, if a taxonomy specifies that the portfolio manager data element is normally accompanied by the text "portfolio manager" but fails to specify that the data element also always appears in a specific location within the source information, processing facility 1820 may cause the taxonomy to be updated to add the location characteristic. Further, processing facility 1820 may indicate that the new characteristic is one which must be satisfied for the data element to be identified, or may be one of a combination of characteristics which might be satisfied and which is examined as part of a logical operation performed by processing facility 1820, as described above. This manner of updating a taxonomy to more closely conform to the characteristics of source information may be performed automatically, or upon receiving confirmation by a user that the update should occur. For example, processing facility 1820 may simply update the taxonomy over time upon observing characteristics of the data element as it appears in the source information, or may cause a user to be prompted (e.g., via a GUI) as to whether an observed characteristic should be added to a taxonomy.

At the completion of act 1720, the process of FIG. 17 completes.

After individual data items are identified, the identified data item(s) may be tagged. For example, identified items may be tagged using eXtensible Markup Language (XML) tags, as is known in the art. In some embodiments, the elements contained in an XML tagged document are defined in a Document Type Declaration (DTD). A validating parser program may, for example, check an XML tagged document for errors.

An example of a DTD, not intended to limit the present invention, is shown in FIG. 19. A number of different elements, some of which include sub-elements, are presented in this example DTD. A compliance document that has been tagged is presented in FIG. 20.

FIG. 21 depicts a DTD wherein the element labeled "performance.annualtotalreturns" may be used to generate a chart presenting the annual total returns for the fund's past ten years. For example, the annual return information within the DTD shown in FIG. 21 may be used to generate a bar chart of the fund's annual return for the years 1990-1999.

The processes described in this section may be used to not only identify and tag individual items of information contained within a summary prospectus, but also to identify and tag detailed information which corresponds to these data items contained in other compliance documents (e.g., a full statutory prospectus, statement of additional information (SAI), etc.). Once a logical association is created between items of information, references (e.g., hyperlinks) may be created between items in the summary prospectus and more detailed information contained in an underlying (in the following description, "source") document or information.

In some embodiments, once a data element and its location within the source information is identified, an indication of the location (e.g., along with other information) may be stored in electronic file storage. In the embodiment depicted in FIG. 18, the indication of the location of the data element is denoted as anchor 1823.

Anchor 1823 may express the location of a data element within source information in any of numerous ways. For example, a location may be expressed as a beginning data character (i.e., in an alphanumeric or text file containing the source information) for the data element and a quantity of characters over which the data element extends. In another example, a location may be expressed as a section of a page, such as might be provided by an HTML hyperlink containing a "#" section reference. In yet another example, a location may be expressed as a collection of pixels in an image file, such that the collection of pixels defines a portion of the image. In still another example, an anchor may not specify a particular location within source information, but may simply specify the source information in its entirety. Any suitable manner of expressing a location at which a data element appears within source information may be employed, as the invention is not limited in this respect.

The anchor 1823, as well as a corresponding data element 1821 and a representation of source information 1825, may be stored in electronic file storage 1830. The representation of source information 1825 may comprise, for example, source information 1800 in electronic form, as created by receipt facility 1810 (e.g., if source information 1800 was provided in hard copy form). The representation of source information 1825 may alternatively comprise a copy of source information 1800, if it was provided in electronic form to receipt facility 1810.

In some embodiments, storing anchor 1823, data element 1821 and source information 1825 in electronic file storage entails creating a logical association therebetween. A logical association may be established, for example, using conventional database technology. For example, if anchor 1823, data element 1821 and source information 1825 are stored in relational database tables, a logical association may be established with a foreign key from one table entry to another, as is well-known in the art. A logical association may be established in any suitable manner.

Once the logical association is established, anchor 1823 may be used to retrieve source information 1825 (or a portion thereof) at which a data element resides. For example, a user viewing an online version of a summary prospectus may retrieve, using corresponding anchor 1823, source information 1825, which may provide additional detail on an item of information included within the online version of the summary prospectus.

Figure 22:
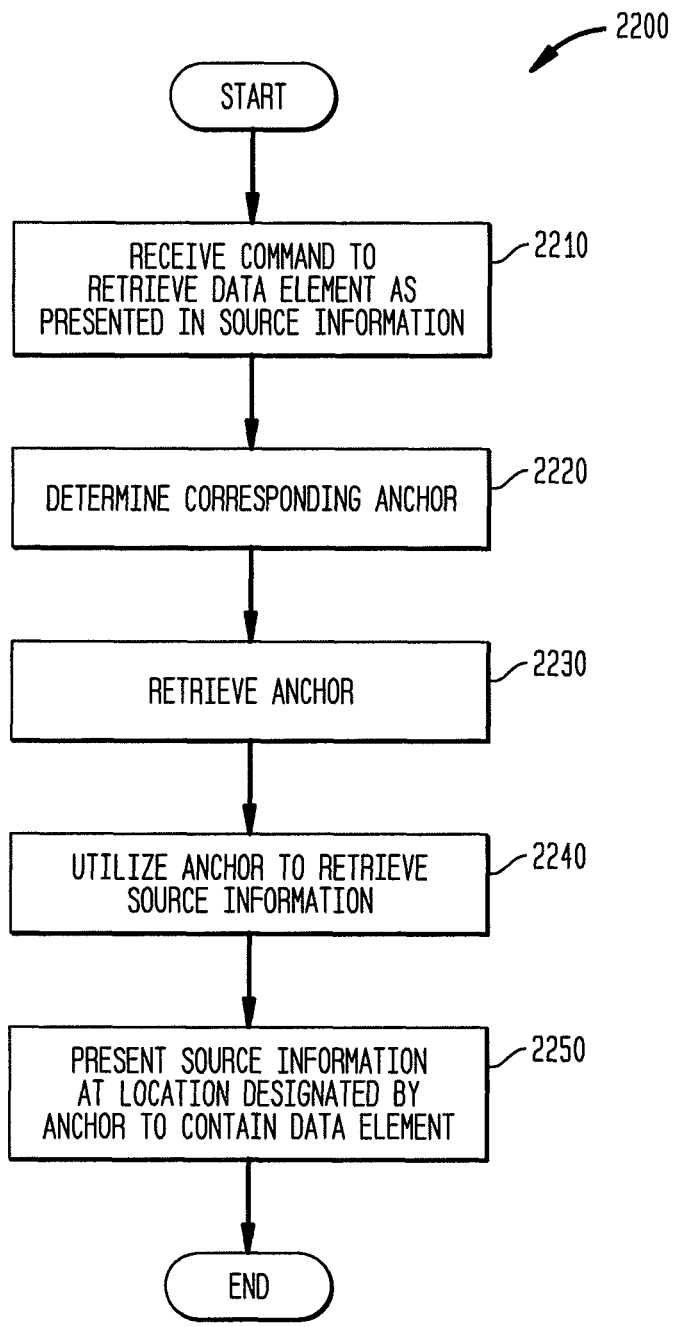
FIG. 22 is a flowchart of an example method for retrieving and employing an anchor to retrieve source information, in accordance with some embodiments of the invention.
Figure 23A:
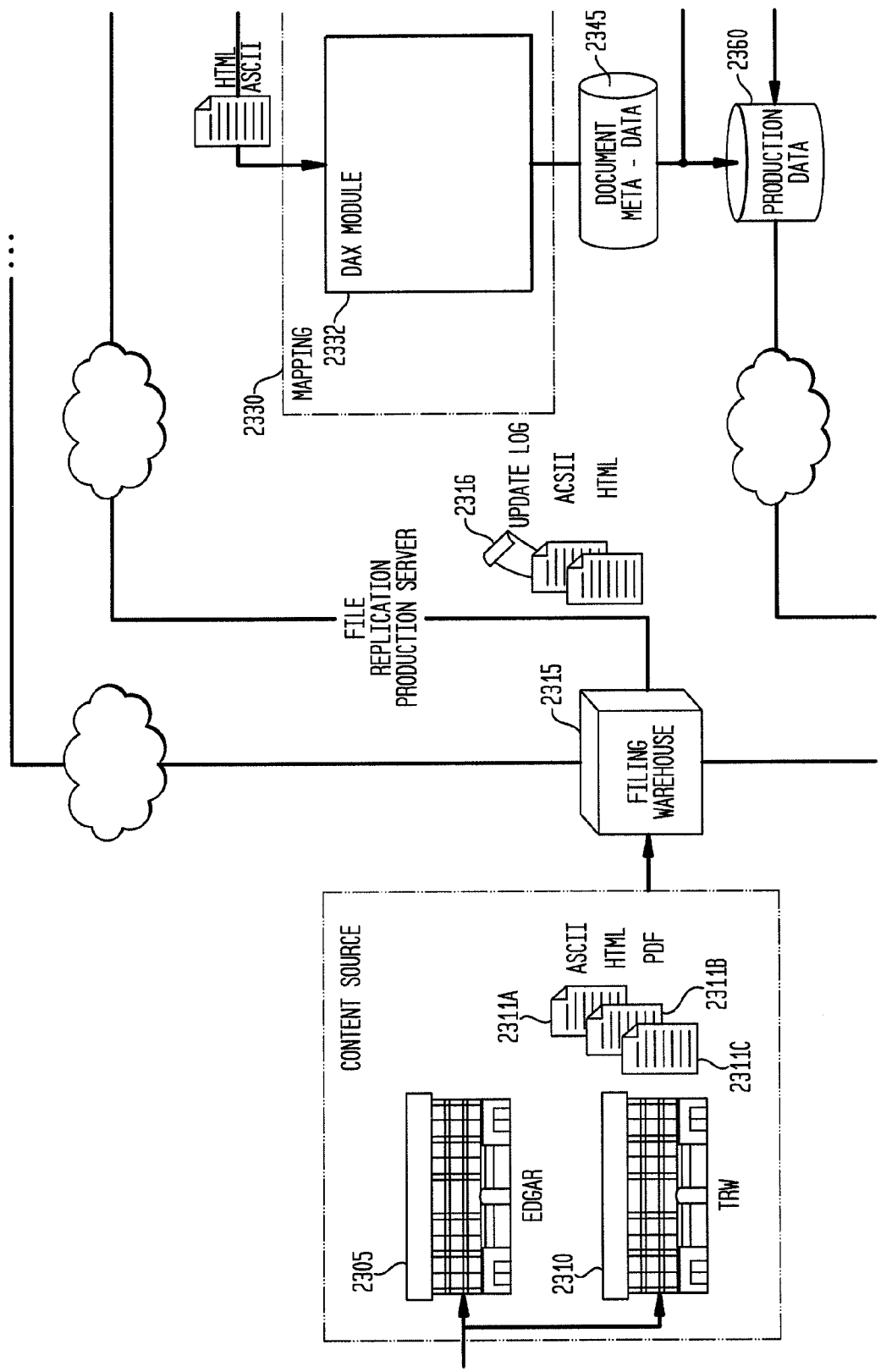
FIGS. 23A-23D are block diagrams collectively depicting a system for managing information related to publicly traded securities.
Figure 23B:
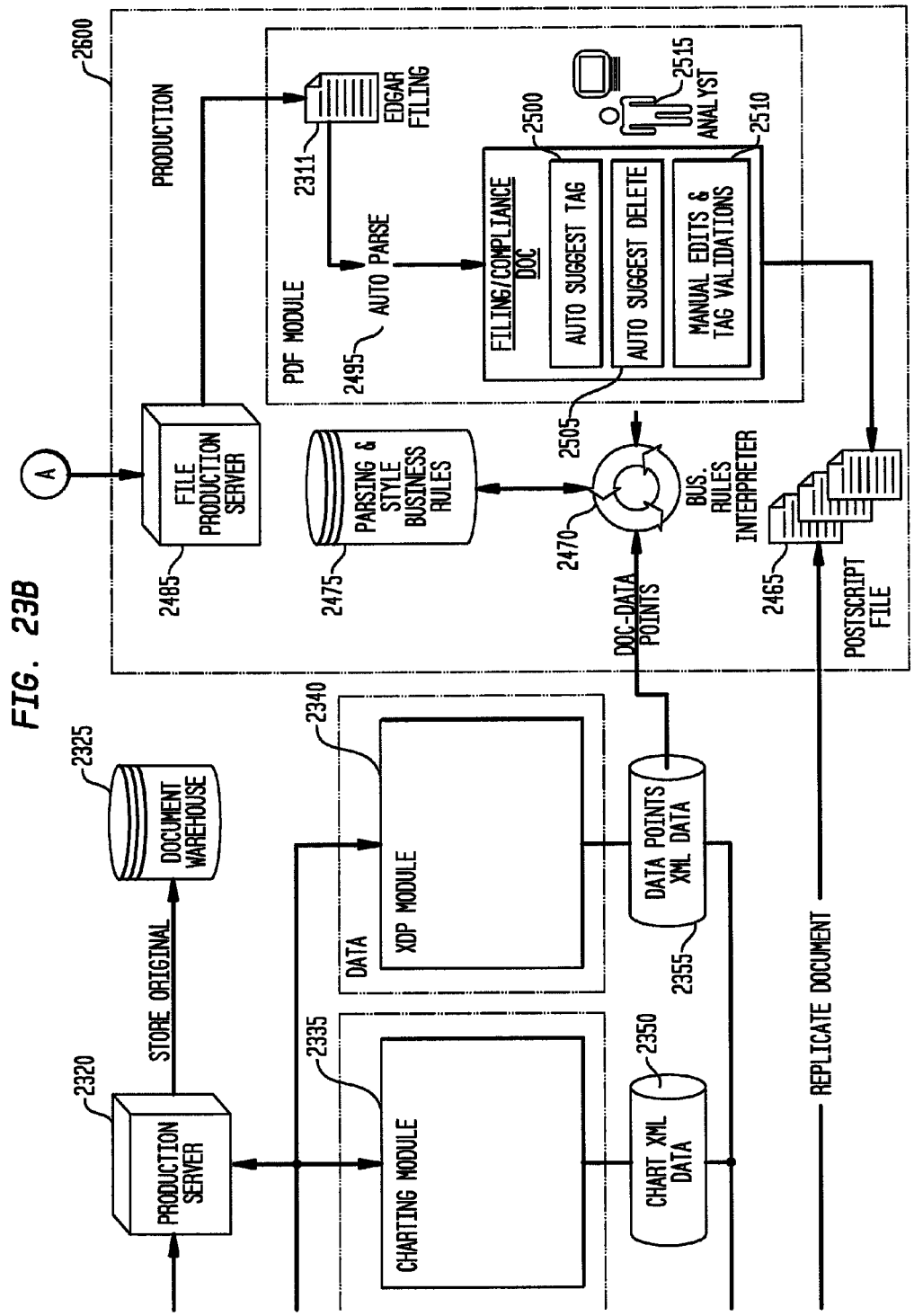
Figure 23C:
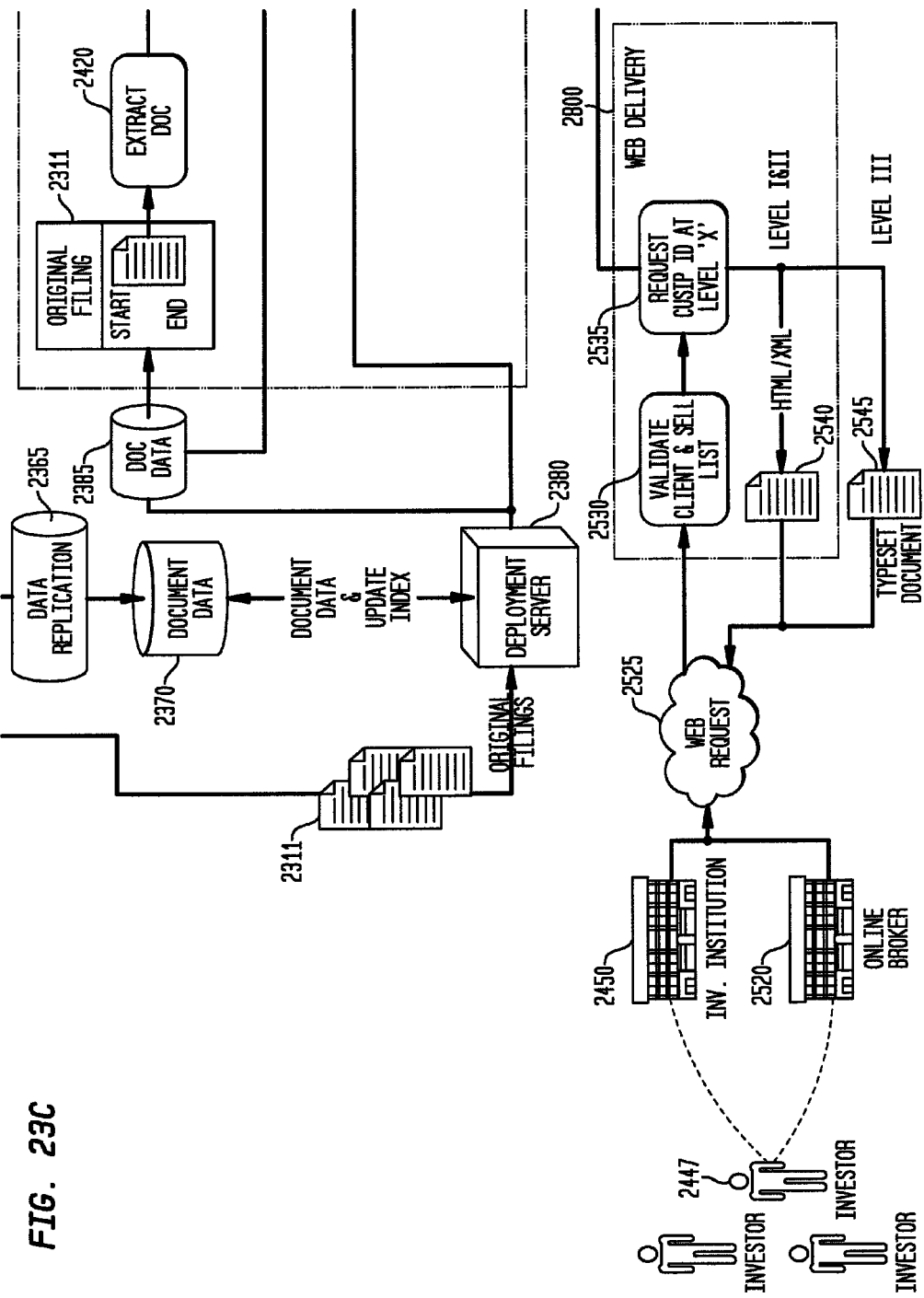
Figure 23D:
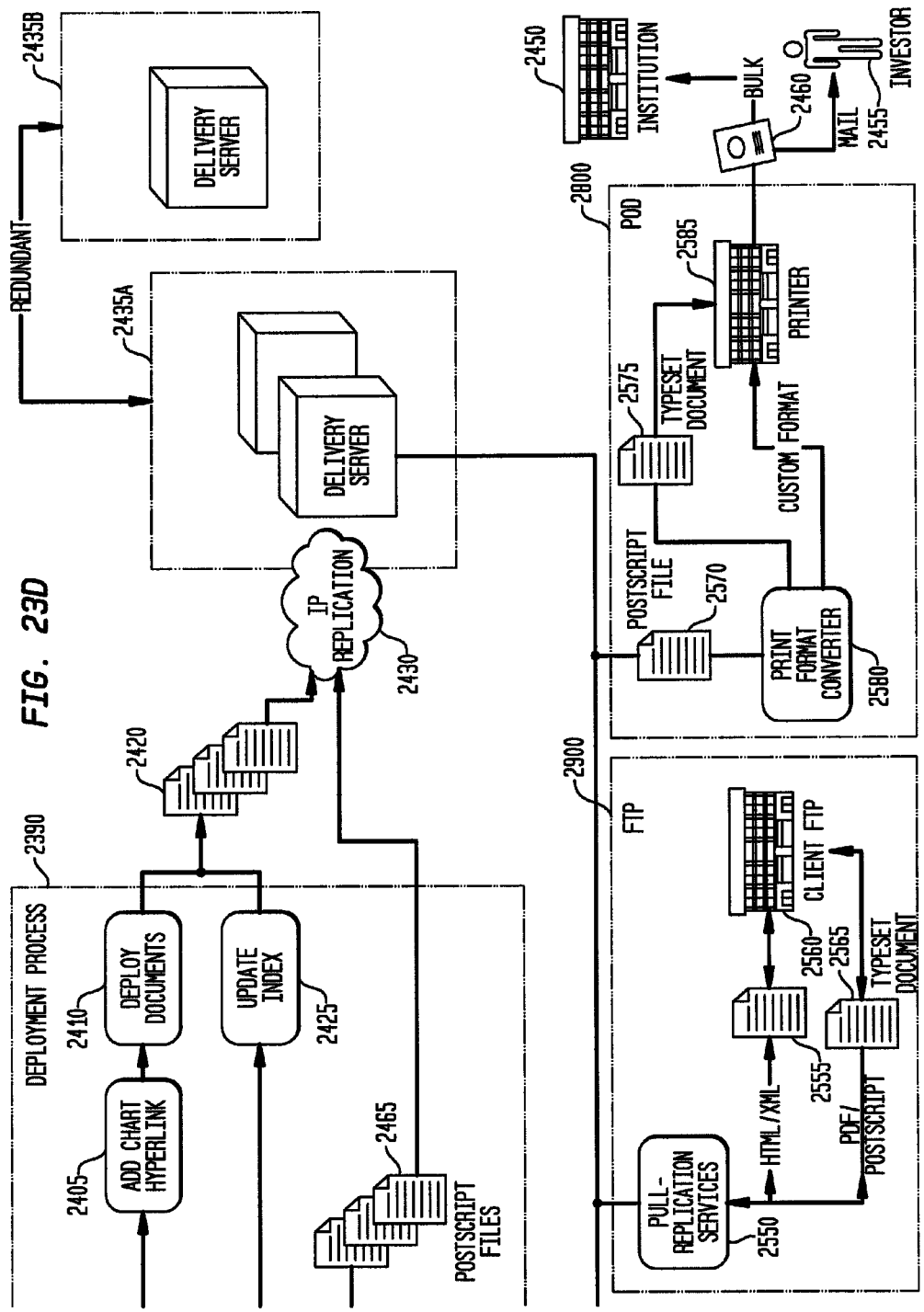

One example of a process 2200 for retrieving source information in this manner is shown in FIG. 22. Upon the start of process 2200, a command is received to display the data element as it is presented in source information. This command may be issued by, for example, a human user via a GUI. The GUI may, for example, display the data element in a manner which informs the user that he/she may retrieve and display the data element as it was presented in source information. This may be done in any of numerous ways, such as with a graphical emphasis on the data element (e.g., an underline) as it is presented on the GUI.

A command may be created and issued in any suitable fashion. In one example, a command may be issued upon a user's invocation of a hyperlink associated with the data element and presented via a GUI, such as a browser application executing on a device in communication with the electronic file storage in which the anchor and/or source information is stored (e.g., electronic file storage 1830). Upon invocation of the hyperlink, the browser application may create and issue a command to the electronic file storage 1830, via any suitable communication protocol. This description of an exemplary command should not be construed as limiting, as a command may be issued, generated or communicated in any suitable manner and using any suitable mechanism, and may take any suitable form. Further, the command may be issued to and from any suitable device. When the command is received by the device, act 2210 completes.

Then the process proceeds to act 2220, wherein the command is processed to determine the anchor corresponding to the data element. In some embodiments, the hyperlink described above may be encoded to specify the anchor. In other embodiments, the anchor corresponding to the data element may be determined using a logical association between the anchor and data element, such as which may be provided by a database (as described above) or other data structure. The identification of the anchor corresponding to the data element may be performed in any suitable fashion, as the invention is not limited in this respect. Upon the identification of the anchor corresponding to the data element, act 2220 completes.

The process then proceeds to act 2230, wherein the anchor is retrieved. This may be accomplished, for example, by executing an instruction specifying the anchor to retrieve a record representing the anchor from electronic file storage. Upon the retrieval of the anchor, act 2230 completes.

The process then proceeds to act 2240, wherein the anchor is employed to retrieve source information, and more specifically the data element as presented in the source information. In some embodiments, the record representing the anchor retrieved in the act 2230 may supply an identifier for another record which contains or refers to the source information. This other identifier may be included in an instruction which is executed to retrieve the record and access the source information. Upon the retrieval of the source information, act 2240 completes.

The process then proceeds to act 2250, wherein the source information, and more specifically the portion of the source information which includes the data element, is presented. In some embodiments, the electronic file storage may transmit the source information to a device which executes a GUI (e.g., the GUI which a user employed to issue the command received in the act 2210), and the GUI may present the source information to the user. Presentation need not occur via a GUI and may occur in any suitable fashion, as the invention is not limited to any particular implementation. Upon the completion of the act 2250, process 2200 completes.

It should be appreciated that the retrieval of source information in which a data element was originally presented need not entail retrieving the entire source information in which the data element resides. That is, a subset of the source information, such as a particular segment in which the data element appears, may be retrieved and/or presented. Retrieval of a subset of the source information may be accomplished in any of numerous ways. For example, source information may be split into segments before it is stored. In another example, only the portion of source information in which the data element resides may be retrieved. Retrieval may be performed in any suitable fashion as embodiments of the invention are not limited in this respect.

It should be appreciated that the preceding section discloses a capability to analyze one or more underlying documents (e.g., a statutory prospectus) to identify the location(s) within the document(s) at which detailed information corresponding to high-level information provided in a summary prospectus is found. Once the location(s) are identified, references may be created to the detailed information. Portions of the information at the identified location(s) may be used to generate a summary prospectus, and the references may be inserted into the appropriate sections of the summary prospectus, to enable investors to navigate between high-level information in the summary prospectus and detail contained in the statutory prospectus. Alternatively, if a summary prospectus is made available by a securities issuer with the statutory prospectus, references to portions of the statutory prospectus may be inserted into sections of an online version of the summary prospectus to enable investors to navigate between the high-level information in the summary prospectus and the supporting detail in the statutory prospectus.

V. Making Summary Prospectus Information Available To Investors

Commonly assigned U.S. patent application Ser. No. 10/916,718, filed Aug. 12, 2004, entitled "Methods and Apparatus for Managing Information Related to Securities," the entirety of which is incorporated herein by reference and relevant portions of which are reproduced herein, describes system and methods which may be employed to information available to investors in various forms (e.g., online, print, etc.). For example, when a securities issuer makes available a new statutory and/or summary prospectus for a security (e.g., via submission to EDGAR), some embodiments of the invention may enable the automatic acquisition and processing of the document(s) to enable the dissemination, in print and/or online form, of information contained therein to investors.

One embodiment of a computer system for making information available to investors is depicted in FIGS. 23A-23D. The system of FIGS. 23A-23D may be employed to perform numerous information management functions.

At a high level, the system includes various components (e.g., software modules) configured to make information available to investors in any of numerous forms. For example, extract module 10 may extract filing data from EDGAR database 2305, and mapping module 2330 may identify individual compliance documents (e.g., one or more summary prospectus documents, statutory prospectus documents, statements of additional information, etc.) within the filing data, and load these documents to electronic file storage. Production module 2600 and Deployment module 2390 may generate versions of one or more compliance documents in different formats, to serve the needs of different users, and load document versions to Delivery Servers 2435A and 2435B, which users may access to view one or more compliance documents. Delivery Servers 2435A-2435B may afford multiple access methods to compliance documents. For example, Web delivery module 2800, which may comprise one or more web servers, may respond to user requests by serving information stored thereon. FTP server 2900 may respond to file transfer protocol (FTP) requests to serve documents. Print On Demand (POD) module 2800 may produce information in print form, customized to specific investor needs. For example, POD module 2800 may be configured to send compliance documents relating to individual investor's holdings.

More detailed aspects of the system of FIGS. 23A-23D will now be described with reference to the lifecycle of a securities filing published by a securities issuer to the EDGAR database 2305 maintained by the SEC. In some embodiments, extract module 2310 issues encoded instructions over a network to perform an extract from EDGAR database 2305, although an extract may be performed in any suitable manner, and using any suitable form of system interface and/or communications infrastructure.

In some embodiments, extract module 2310 identifies and extracts various filings submitted to the EDGAR database 2305 by mutual fund companies, corporations, or other issuers of securities. For example, securities issuers may submit filings to EDGAR in formats which include American Standard Code for Information Interchange (ASCII), hypertext markup language (HTML), portable document format (PDF), or a combination thereof. Extract module 2310 may, for example, extract filings as they are submitted to EDGAR, at some predetermined interval (e.g., daily), or at any other suitable time. In the example process shown, extract module 2310 transmits ASCII file 2311A, HTML file 2311B, and/or PDF file 2311C to electronic filing warehouse 2315, which may comprise any suitable combination of software and/or hardware components.

Filings 2311 stored in electronic filing warehouse 2315 are then replicated to deployment server 2380, production server 2320 and PDF production server 2485, each of which may comprise any suitable combination of hardware and/or software components. Each of servers 2380, 2320 and 2485 execute modules designed to perform different functions, as described below.

As described above, EDGAR filings commonly include information related to multiple securities, as well as multiple types of information related to those securities. For example, a single EDGAR filing may contain a prospectus for Fund A and an annual report for Fund B, and three prospectus supplements for Fund C. Thus, an investor seeking information on only Fund A, B, or C may find the filing unwieldy, confusing and difficult to decipher.

In some embodiments, the techniques described above in Section I may be employed to separate filings into distinct components. In the example process shown in FIG. 23, filing data arrives at production server 2320, and the components of module 2330 identifies one or more distinct filings within the data. In particular, DAX module 2332, charting module 2335 and XDP module 2340 process filing data when filing data is received from filing warehouse 2320.

DAX module 2332 includes programmed routines designed to interpret data elements provided in an ASCII- or HTML-based EDGAR filing to identify the filing's distinct components. For example, DAX module 2332 may identify the portions of a filing relating to different securities, the issuer of the filing, its effective date, and any special rules which may apply (e.g., a supplement which may only be displayed with an accompanying document). Thus, DAX module 2332 identifies the individual "documents" that comprise each filing, representing information useful to an investor. DAX module 2332 may, for example, separate comingled filing data representing prospectuses and supplements for eight different funds, and "tag" documents so that subsequent processes may interpret the identified documents. In the example process shown, data is tagged using extensible markup language (XML) tags.

Charting module 2335 enables, in some embodiments, a semi-automated process whereby data elements provided in ASCII- and HTML-based filings may be interpreted to create charts. In this respect, the SEC prescribes that certain compliance documents must contain graphical representations of certain types of information (e.g., charts showing historical performance of the considered security). As ASCII and HTML data provided in filings submitted to EDGAR are incapable of expressing information in graphical form, charting module 2335 processes the ASCII and/or HTML data to create the prescribed charts. In some embodiments, charting module 2335 may pre-identify data elements in a ASCII or HTML filing likely to be used for creating a chart, prompt a human user to confirm that the pre-identified elements are to be used for chart creation, and if so, create XML tags and instructions which may be used by subsequent processes to create one or more charts in graphical form for the eventual document.

XDP module 2340 enables the processing described above in Section II whereby a set of predefined data elements are located within each filing and tagged (e.g., using XML tags). As described above, any of numerous data elements may be identified and tagged, such as data elements which may be useful to investors in comparing one security to another. In some embodiments, XDP module 2340 employs various keywords and defined business rules to preliminarily identify individual data elements, prompt a human user to confirm whether each data element has been correctly identified, and if so, creates a tag for each data element so that subsequent processes may quickly identify their location within a document.

In the example shown in FIGS. 23A-23D, DAX module 2332, charting module 2335 and XDP module 2340 produce document metadata 2345, chart XML data 2350 and data point XML data 2355, respectively, and transmits this information to production data 2360 and PDF production server 2485. This output may, for example, comprise XML tags, instructions and other information which may be employed by subsequent processes to separate a filing into document components. By passing instructions, tags and other data, rather than identified documents themselves, the system may conserve network bandwidth and decrease the time required to transmit information.

In the example depicted, PDF Production Server 2485 also receives filing data from filing warehouse 2315. In some embodiments, PDF Production Server 2485 may enable a process whereby filing data received from filing warehouse 2315 is converted to typeset (i.e., non-editable) form, so that the information may be transmitted or otherwise made available to investors in that form. For example, in one embodiment, filing data may be converted to a Portable Document Format (PDF) document, which may be transmitted or made available to investors via a web site.

In the example shown, the process of converting filing data to typeset form is performed by PDF Production Server 2485. Specifically, in this example, PDF Production Server 2485 produces a preliminary, preformatted version of a data structure representing filing data, which is then transmitted to a user's workstation (e.g., analyst 2515) for editing. The user may provide various instructions via a GUI executing on the workstation to invoke functionality provided by PDF Production Server 2485, so that a typeset document 2465 may be created. The typeset document is then transmitted to production data 2360.

In the example shown, the information stored at production data 2360 (i.e., document metadata 2345, chart XML data 2350, data points XML data 2355, and PostScript file 2565) is sent, with document data 2370, to deployment server 2380. As a result, at this point in the process, deployment server 2380 stores filing data 2311 and the information required to separate the filings into documents. This data is represented collectively as data 2385.

Extract module 2420 receives filing data 2311, as well as information provided in document metadata 2345, to extract one or more compliance documents from filing 2311. For example, extract module 2420 may process instructions provided by document metadata 2345 to determine the start and end of each document included within filing 2311. In some embodiments, extract module 2420 produces output in the form of an "un-styled" HTML document.

Module 2405 then adds a chart (and/or hyperlink to a chart) to applicable documents. In some embodiments, module 2405 processes information provided by chart XML data 2350 to construct a file containing a graphical representation (e.g. chart) of information, and may insert a hyperlink into the HTML document produced by routine 2420 which references the file. The file may be created in any suitable graphical file format, including .jpg, .gif, or other file formats.

In the example shown, HTML documents are then deployed to delivery servers 2435A-2435B. In some embodiments, delivery servers 2435A-2435B are equipped to receive and transmit network-based (e.g., web-based) communication. In the embodiment shown, all of the HTML documents created are transferred to delivery servers 2435A-2435B, and deleted from deployment server 2390 (of course, they may be recreated from the raw filing data and instructions produced in routine 2330).

It should be appreciated that another drawback with information on the EDGAR database (i.e., in addition to the unwieldy nature of the filings discussed above) is that there is no quick, reliable or easy way to determine the most current version of filings for a particular security. For example, it is not uncommon for a mutual fund company to file more than one prospectus for each of its funds on EDGAR. Each prospectus may be the subject of a replacement (whereby the issuer files a newer version of a prospectus to take the place of one already on file, but does not remove the older version), a revision (whereby the issuer files a newer version which modifies a prospectus already on file, but does not remove the older version), and/or one or more supplements or "stickers" (whereby the issuer indicates that a portion of the version on file should be replaced or supplemented with new information, but does not remove the older version). As a result, it can be extremely difficult for an investor to determine which version of an EDGAR filing for a security is the most current.

The system of FIGS. 23A-23D provides a capability to identify, and direct an investor to, the most current versions of compliance documents for a security, accounting for such filings as revisions, replacements and supplements. In the example shown, deployment module 2390, using update index module 2415, creates and maintains a "compliance envelope" in which is stored the location of the most current compliance document(s) for each security on file. For example, a compliance envelope for a given security may include the location of a most current prospectus, annual report, semi-annual report, statement of additional information, and/or all supplements for the security that satisfy certain requirements.

To create the compliance envelope, update index module 2415 determines whether a document contained within a given filing represents the most current information for the security, and thus warrants an update to the compliance folder. For example, update index 2415 may process data in the filing to determine whether a document should be designated as most current. In this respect, a document may contain information, such as an effective date, which defines when it should be made available to investors (documents are often filed in advance of their effective date, so may have to suspend their delivery for a time, then indicate when the effective date arrives that the document is most current). The effective date may also be used to determine when the document should be designated as the most current document, as well as how long it will remain effective. Thus, in some embodiments, although every document is deployed to delivery servers 2435A-2435B, the update index module 2415 uses the effective date to determine whether a particular document is most current, and if so updates the location for the considered type of document within the compliance envelope to reflect this. For example, update index module 2415 may process a number of rules to determine whether a particular document is the most current of certain types (e.g., prospectus, annual report, and semiannual report documents). In addition, rules may be processed to determine whether to make available a compliance envelope entry for a security. Example rules for determining whether a document is the most current of its type and/or whether an entry for a compliance envelope should be made available to investors are provided in above-referenced co-pending U.S. application bearing Ser. No. 10/916,781.

If update index module 2415 determines that a particular document is the most current of its type, it modifies the compliance folder to include the location of that document on servers 2435A-2435B, so that the most current of each type of compliance document may be easily accessed by investors. Thus, for example, when an investor issues a web-based request for a prospectus for Fund X, one of servers 2435A-2435B may access the compliance envelope to determine the location of the most current prospectus (as well as any additional information germane to the request and/or document, such as applicable supplements), and serve that data to the investor. In the embodiment shown, the compliance envelope is implemented using a table which reflects the location (i.e., within one or more file systems stored on delivery servers 2435A-2435B) of the most current document of each type for a particular security. However, a compliance envelope need not be implemented using a table, and may be implemented in any of numerous ways, such as with any form of data structure. The system is not limited to any particular implementation.

In some embodiments, using a compliance envelope to process investor requests for documents relating to a security may minimize the processing which a delivery server performs. For example, having an identified location of the most current compliance document of each type may mean that a delivery server need not perform logical processing (e.g., to compare characteristics of various compliance documents stored thereon) to determine the most current, but rather can simply retrieve the document from the identified location. In this manner, the response time of delivery servers 2535 may be minimized.

As described above, delivery servers 2435A-2435B may provide several vehicles through which an investor may access information stored thereon. Three of these vehicles (i.e., web delivery, FTP, and POD) are depicted in FIG. 23, although any suitable vehicle(s) may be employed.

In some embodiments, a web delivery vehicle may allow an investor 2447 to access information stored on delivery servers 2435A-2435B via the worldwide web. For example, investor 2447 may use a web browser to access a web site hosted by or for investment institution 2450 or online broker 2420 (i.e., exemplary entities that an investor uses to access information related to securities) on one of delivery servers 2435A-2435B. When an investor issues a request 2525 for information to the web site, validation module 2530 may authenticate the investor and determine the security for which the investor seeks information (e.g., based on a provided CUSIP).

In some embodiments, the format in which the information should be provided (e.g., as HTML, XML, PDF, etc.) is also determined. In the example shown, an indication of the format is provided within the URL used to issue the request, although this indication may be provided using any suitable mechanism(s). Validation module 2530 may process the request to determine whether the entity for which the site is hosted is approved to provide information for the considered security in the format requested.

In the example shown, if the request is validated, then module 2535 retrieves the requested information for the considered security and provides it to investor 2447 (e.g., as either HTML/XML document 2540 for "Level I/II" or PDF document 2545 for "Level III"). The retrieval process may include using the compliance envelope to determine the location of the document requested in the specified format.

In some embodiments, information may not be sent to an investor 2447 in response to the investor's request, but rather in response to a document having been published to EDGAR. For example, an investor may have given prior consent to electronic delivery of updates to certain types of documents for a particular security. Thus, when an updated document is identified, the system may cause the document (e.g., in PDF form) or a message indicating that a document and the location at which it is available, to be sent to the investor. Commonly assigned U.S. patent applications bearing Ser. Nos. 09/023,039 (entitled "Obtaining Consent for Electronic Delivery of Compliance Information") and 09/785,630 (entitled "Method and Apparatus for Providing Financial Transaction Data Via The Internet") disclose example techniques for obtaining investor consent to electronic delivery of information and for providing data related to securities transactions, respectively, which may also be employed to deliver compliance documents, such as a summary prospectus, to an investor.

Of course, compliance documents such as a statutory and/or summary prospectus need not be sent to investors electronically, as they may also, or alternatively, be provided in hard copy form. The embodiments of the invention which provide a capability for a statutory and/or summary prospectus to be sent to an investor in hard copy form may also provide functionality for suppressing delivery to certain investors. In this respect, it should be appreciated that although the SEC generally requires that a prospectus for a security be delivered to an investor within a specified timeframe after certain events occur (e.g., after the investor purchases the security), there are exceptions to this general rule. For example, a prospectus need not be sent to an investor who previously received that prospectus, or who is purchasing additional shares of the security (i.e., rather than making an initial purchase). As such, embodiments of the present invention provide a capability for determining, using data on investor holdings, previous investor mailings, and filings acquired from EDGAR to determine the investors to whom a newly published statutory and/or summary prospectus should be sent. In particular, some embodiments provide a capability for producing a "print recipe" identifying investors to whom a summary prospectus should be sent.

Figure 24:
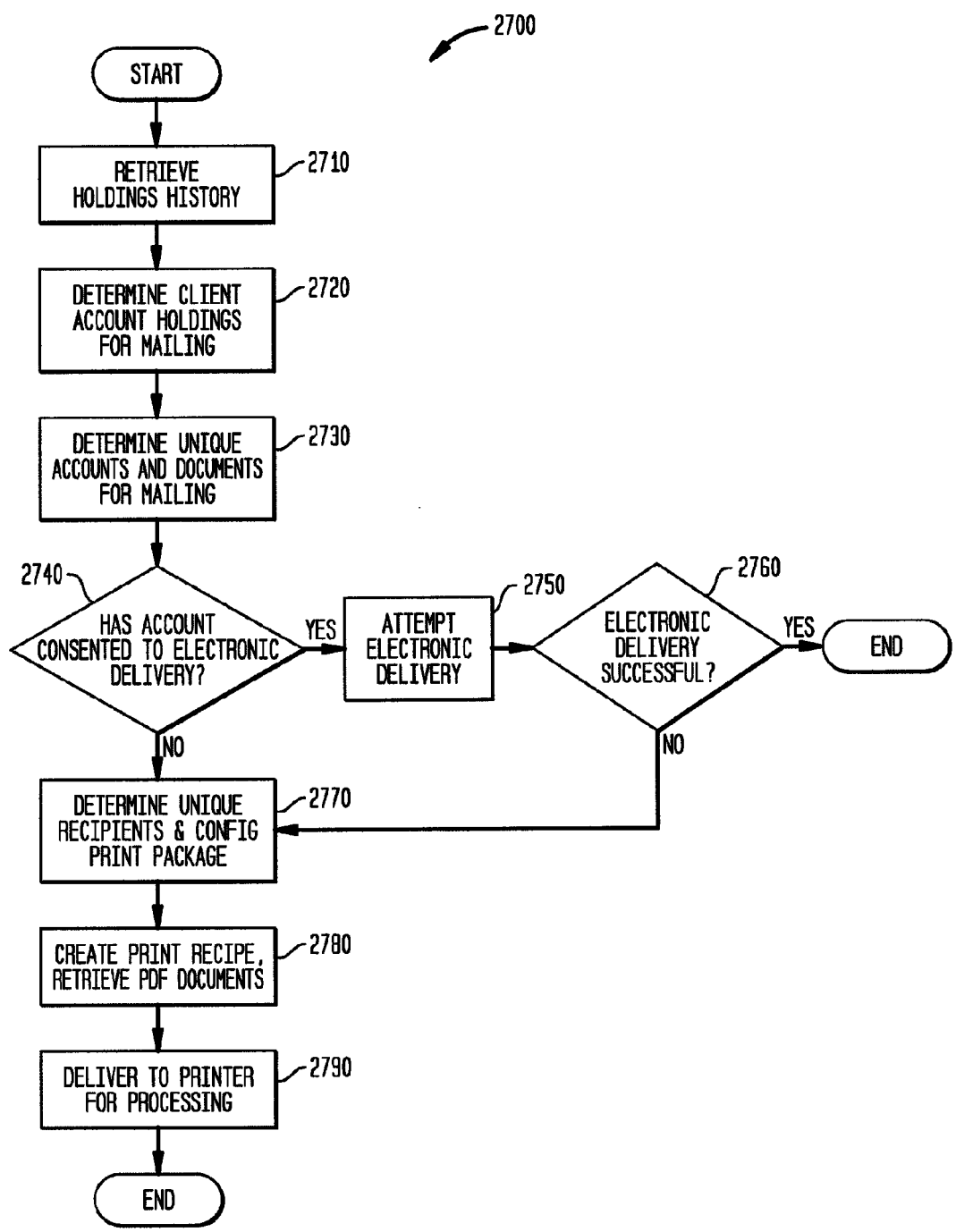
FIG. 24 is a flowchart of an example print run process, in accordance with some embodiments of the invention.

FIG. 24 depicts an example process 2700 for identifying investors to which one or more documents (e.g., published statutory and/or summary prospectuses) should be sent. At the start of process 2700, a data structure containing information relating to previous activity for an entity's (e.g., an issuer's, intermediary's, etc.) clients (e.g., investors) is retrieved in act 2710. This information may, for example, be data on each investor's investment positions, and mailings previously sent to each client. This file may be retrieved from electronic file storage (e.g., a database maintained for the customer) which stores information related to the entity and its clients.

Figure 25:
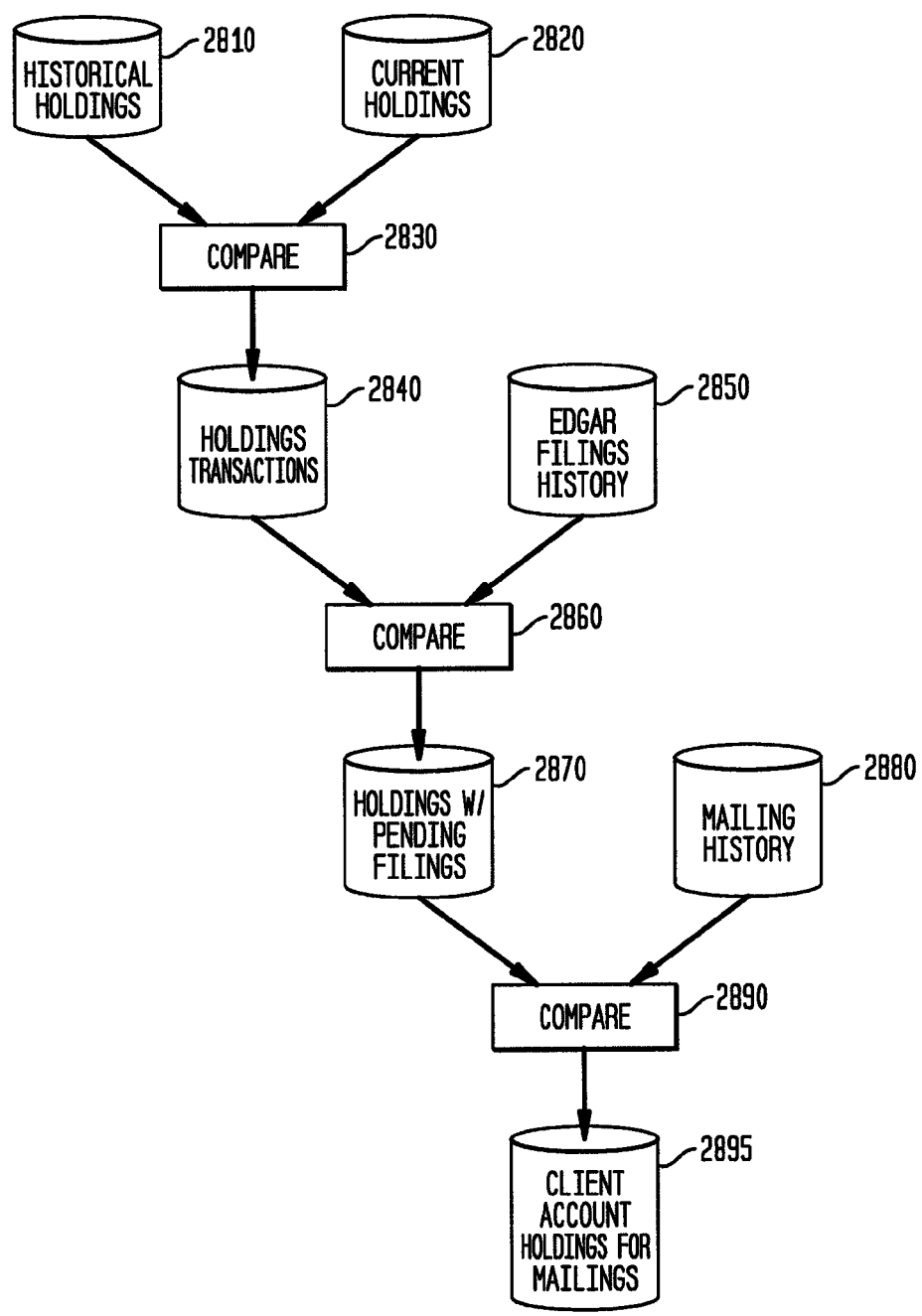
FIG. 25 is a block diagram depicting an example technique for identifying client accounts, holdings and documents for inclusion in a print run, in accordance with some embodiments of the invention.

Upon the completion of the act 2710, the process proceeds to act 2720, wherein the holdings for each investor account which qualify for the mailing are determined. One embodiment of a method for determining client account holdings which qualify is depicted in FIG. 25, which utilizes the data structure retrieved in act 2710. The method described with reference to FIG. 25 may also be embodied in one or more software routines programmed in any suitable programming language, and may be executed on any suitably configured computer system. FIG. 25 depicts a simplified version of this process; possible variations are described below.

In FIG. 25, historical holdings data 2810 and new holdings data 2820 are compared in act 2830 to determine client holdings changes 2840. Then, client holdings changes 2840 and EDGAR filings data 2850 are compared in act 2860 to determine holdings which have currently effective filings 2870. Then, the holdings with currently effective filings 2870 and historical mailing data 2880 are compared in act 2890 to determine the client account holdings to be included in the mailing 2895.

There are numerous variations to the process of FIG. 25 which may be achieved by applying various business rules to the process. Business rules may be provided in the form of a data structure that is accessed during the execution of the process shown, may be "hard coded" into one or more programmed routines which comprise, either completely or in part, the process of FIG. 25, or provided in any other suitable manner. Business rules may be provided which dictate that:

If a client does not own a certain security, documents related to that security should not be mailed to the client.

If a client has previously received a document, the document should not be mailed to the client.

If a client purchases a security in the current period and has not previously received a document with a current effective date for that security, the document should be mailed to the client.

If a client has previously received a document with a current effective date for a security, but has not received a supplement which has a current effective date, the supplement should be mailed to the client.

If a client has previously received a document which contains information related to a security that the client purchased in the current period (e.g., if the document previously received also contained information for another security purchased by the client), the document should not be mailed to the client.

If a client previously received a document for a security, then sold the security, then re-purchased the security before the document's effective date had lapsed, the document should not be mailed to the client.

If a client account was previously inactive because the client had stopped making contributions, and the account became active in the current period, a prospectus should only be sent for the securities in the account if the effective date of the previously received prospectuses are past.

If a client is a new participant in a plan but has not yet purchased a security under that plan, a prospectus for all securities offered under the plan should be mailed to the client.

If a customer offers a new security under an existing product (e.g., a variable annuity), send a prospectus to each client who owns that product for that security.

Alternatively, client accounts may be selected for inclusion in a mailing according to criteria which are unrelated to their holdings or mailing history. For example, clients may be selected that participate in a certain type of plan (e.g., a 401(k) plan), own a certain type of product (e.g., a variable annuity), or own a certain security (e.g., IBM stock) may be selected for a mailing. In this manner, a customer may execute promotions related to certain products, plans, or securities. The selection of client accounts for a mailing may be performed in any suitable manner.

Referring again to FIG. 24, upon the completion of act 2720, the process proceeds to act 2730, wherein unique accounts and documents to be included in the mailing are determined. One method for determining unique accounts is to consolidate multiple records which share a common identifier (e.g., account number). However, any suitable technique for identifying unique accounts may be employed.

The determination of the documents to be included in a mailing may include multiple steps. First, business rules may guide whether document supplements are to be mailed. For example, the rules may dictate that if a client mailing includes only a supplement, the supplement should not be mailed, because the expense is unjustified. On the other hand, rules may dictate that a supplement is sent regardless of whether it constitutes the sole mailing for that client. Second, the process may identify whether a client holds multiple securities described in a combined document (i.e. documents containing information related to more than one security) and include that document in the mailing only once. There are numerous ways to identify the documents to be included in a mailing, and the process is not limited to a particular implementation.

Upon the completion of act 2730, the process proceeds to act 2740, wherein a determination is made as to whether any clients have consented to electronic delivery. This determination may be made by comparing the client accounts to a data structure containing client accounts which have consented to electronic delivery. The records for clients who have not consented are passed to the act 2770, while the records for clients who have consented are passed to the act 2750. In the embodiment shown, act 2770 is not performed until the completion of acts 2750 and 2760.

In act 2750, electronic delivery is attempted for those clients which have consented. As described above, electronic delivery may include a message sent to a client's e-mail address or a text message sent to the client's wireless device (e.g., cell phone or PDA) indicating that the document is available for retrieval from a web site identified (e.g., with a URL) in the message, or other form of notification.

Upon the completion of the act 2750, the process proceeds to act 2760, wherein it is determined whether each attempt at electronic delivery was successful. This may be performed by determining whether a message was returned. If it is determined in act 2760 that electronic delivery was successful for a particular client record, the process ends for that client record. If it is determined in act 2760 that electronic delivery was unsuccessful for a client record, the record is passed to the act 2770, to be processed with those client records that did not consent to electronic delivery. In addition, the record may have an indicator set which triggers the creation of a message (e.g., a mail-gram or other notice) which notifies the client that electronic delivery failed.

In act 2770, the unique recipients and print package for each client mailing are determined. In one embodiment, the unique recipients for a mailing are determined by executing a house holding process. In some implementations, a house-holding process seeks to identify multiple client records which belong to a single household, so that only a single mailing may be sent to that household. The process may be configured to identify records with a common household in any of numerous ways, such as according to regulations issued by the SEC, or according to business rules supplied by a customer. For example, the process may be configured to determine that client records having equivalent last name and address fields should be assigned to the same household. In addition, the process may also determine the unique funds held by household members. For example, if two members of the same household own the same security and were to receive the same document for that security, the process may eliminate one of the duplicate documents from the mailing.

The print package to be delivered to each recipient may be configured in any of numerous ways, such as with business rules provided by the customer. For example, the customer may specify that documents sent to participants in particular plans, clients who own specific products or securities, or clients in specific geographic regions should be given customized covers, such as covers which specify a product name, logo, return address, or other information. The customer may also specify that documents sent to particular clients should be given customized cover letters, such as letters which specify a plan name, fund name, or client e-mail address.

Upon the completion of act 2770, the process proceeds to act 2780, wherein the print recipe is created and the documents which are include in the print recipe are retrieved. According to one embodiment, the recipe includes a collection of records, each of which includes information describing a unique client, indications of the documents that are to be sent to the client, and other indicators for how the mailing is to be customized.

Figure 26:
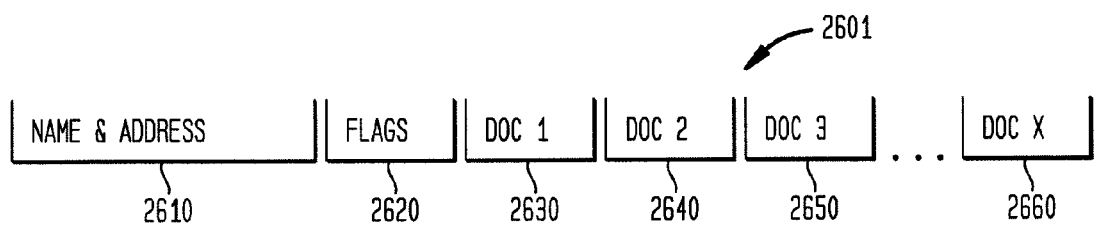
FIG. 26 is a representation of an example data record for inclusion in one or more printed compliance documents in a print run, in accordance with some embodiments of the invention.

An exemplary print recipe record is depicted in FIG. 26. Record 2601 includes to portion 2610, in which name and address information for a client is stored. This information may be the result of the house holding process described above. Portion 2620 stores indicators which are interpreted by a print vendor to customize the mailing to the client. For example, portion 2620 may contain an indicator for the name of the plan in which the client is a participant, so that the plan name may be printed on the cover of the mailing sent to the client. Portions 2630, 2640, 2650 and 2660 store indications of the documents to be included in the mailing to the client.

Referring again to FIG. 24, in act 2770, the process retrieves the documents which are specified by the print recipe. This may be accomplished in any of numerous ways, such as by retrieving PDF documents from delivery servers 2435A-2435B (FIG. 23), or by requesting PDF documents from the customer.

The act 2780 may include splitting the print recipe file into multiple files. This may be done for any of numerous reasons. For example, a customer may have requested that its own PDF files be used instead of those created in the PDF production process shown in FIG. 23 (e.g., because the customer PDF files are smaller and more decoratively styled than those created by the process of FIG. 23), but may have sent only a portion of the PDF files which are specified in the print recipe. In this case, act 2780 may include splitting the print recipe file into a first portion containing only the PDF documents received, and a second portion which contains PDF documents not yet received. In another example, the print recipe may be split into multiple files to accommodate economic considerations. For instance, the print recipe may be split into a first portion which will be offset printed, and a second portion which will be digitally printed. In yet another example, the documents for a particular security, plan or product may need to be printed before others for various reasons, such as to meet compliance requirements set by the SEC.

Upon the completion of act 2780, the process proceeds to act 2790, wherein the print recipe and the specified documents are used to prepare a set of documents for delivery to investors. Upon the completion of act 2790, the process 2700 ends.

The techniques for processing securities-related information described above may be performed at a configurable periodicity. For example, in some embodiments, information contained in a summary prospectus and/or corresponding detailed documents may be processed throughout the year (e.g., the calendar year and/or a securities issuer's or intermediary's fiscal year) so that as new detailed documents are made available, an online version summary prospectus may provide access to this updated information, either in addition to or instead of information previously made available by a securities issuer or intermediary. For example, an exhaustive repository of information relating to a security (e.g., multiple online version summary prospectuses, which may have issued periodically and include information that has changed over time, with the detailed documents corresponding to each online version) may be provided, or only the most current version of information relating to a security (e.g., a single, most current online version summary prospectus and the current documents it references) may be made available, or some combination of these approaches may be employed (e.g., by providing access to a single, most current online version summary prospectus, and a repository of detailed documents that include information that has changed over time, vice versa, etc.). The invention is not limited to any particular implementation.

Some embodiments may make provisions for compliance with periodic update requirements set forth by the SEC and/or other regulatory agencies. For example, if the SEC issued a new requirement that securities issuers and/or intermediaries must make available updates to a security's statutory and/or summary prospectus, or portions thereof, more frequently than annually (e.g., quarterly), then embodiments of the invention may be configured to enable creation of a new online version summary prospectus and/or updates to an existing online version summary prospectus with updated information (e.g., updates to a mutual fund's top holdings) at the required frequency. If an existing online version summary prospectus is updated to include new or revised information, this information may be acquired from any of numerous sources. For example, information may be acquired (e.g., using the techniques described above in Sections I-III) from a new statutory prospectus or other document published by the securities issuer and/or intermediary (e.g., a new summary prospectus, supplement, SAI and/or other document(s)) and/or other information. Embodiments of the invention are not limited to any particular implementation.

If updates to information on a security occur more frequently than annually, and a new online version summary prospectus is created, then embodiments of the invention may provide a set of investor information resources which includes one or more previous online version summary prospectuses, each including links to corresponding detailed documents. For example, a reference between each online version summary prospectus and the detailed documents it references may be kept static over time, even as new summary prospectus and/or detailed documents are published by a securities issuer and/or intermediary. As such, embodiments of the invention may enable an investor to review previous online version summary prospectuses and the detailed documents referenced thereby to determine how certain key information relating to a security has changed over time, or to review information on a security as of a certain date, enabling a more thorough analysis of a security's history along dimensions which are important to the investor. For example, the investor might gain insight into how a mutual fund's top holdings changed over time (perhaps giving some indication of how volatile are the fund's holdings), whether there have been any increases in certain fees over time (perhaps giving some indication of whether and when further fee increases might be expected), etc.

Of course, the invention is not limited to being implemented with static links from a given online version summary prospectus to underlying detailed documents, as relationships between online version summary prospectuses and underlying documents need not be one-to-one, and may change over time. For example, when a new online version summary prospectus with links to updated detailed documents is created, previous online versions may be retained, but the links to detailed documents in those previous online versions may be updated to reference the most recent versions of those detailed documents, may be supplemented with links to the most recent versions of those detailed documents, or may be otherwise modified. In this manner, an investor who accesses an online version summary prospectus which is not the most up-to-date (e.g., an investor who enters an outdated URL provided on a previous hard copy summary prospectus mailed to the investor some time ago) may be alerted that more current information is available, while still enabling the investor to see how information on the security has changed over time.

Some embodiments of the invention may enable making multiple versions of a particular summary prospectus available to investors in hard copy and/or online form. This may be desirable, for example, because some investors in a given security may have who purchased it directly from the issuer, while others may have purchased the security through an intermediary (e.g., a broker-dealer), and each entity which sells the security to investors may wish to have the summary prospectus branded a particular way to engender investor loyalty and brand awareness. For example, each entity that sells the security to investors may employ different branding elements (e.g., logos, text fonts, formatting styles, etc.) in generating a hard copy summary prospectus for delivery to investors. These branding elements may, for example, be overlaid or otherwise added to a preliminary version of the summary prospectus made available by the security issuer (e.g., via the EDGAR database). As a result, a first group of investors who purchase the security directly from the issuer may receive one version of a hard copy and/or online version summary prospectus which contains branding elements specific to the issuer, while a second group of investors who purchased the security through an intermediary (e.g., a broker/dealer) may receive a version of the hard copy and/or online version summary prospectus which is specific to the intermediary from which the security was purchased and which contains branding elements specific to the considered intermediary. As a result, each entity may market its services to the investors to whom it delivers the hard copy and/or online version summary prospectus.

Some embodiments may provide for creating different versions of a hard copy summary prospectus, each including a different URL for a different online version summary prospectus, to accomplish a similar objective. For example, one version of a hard copy summary prospectus may be created for investors that purchased the security through the issuer, with that version including a URL for an online version summary prospectus hosted on the issuer's web site, and one or more other versions may be created for investors that purchased the security through an intermediary, with each version including a URL for an online version summary prospectus hosted on a respective intermediary's website. As such, each intermediary may have an opportunity to markets its services to investors via its online version summary prospectus version.

Versions of a hard copy and/or online version summary prospectus may be created in any of numerous ways, as embodiments of the invention are not limited to any particular technique. For example, the processes described above in Section I may be employed by an intermediary and/or service provider engaged thereby to identify when a summary prospectus is published for a security held by a customer of the intermediary (i.e., an investor). When a summary prospectus is published, the techniques described in Section II-III may be employed to create a hard copy summary prospectus for delivery to the investor which includes branding elements specific to the intermediary, and a URL for an online version summary prospectus which is hosted on the intermediary's website (or a website created by the service provider for the intermediary). Similarly, a securities issuer and/or service provider engaged thereby may employ the techniques described above when publishing a summary prospectus for a security held by customers to create a hard copy summary prospectus for delivery to each customer which includes branding elements specific to the issuer and a URL for an online version summary prospectus which is hosted on the issuer's website (or a website created by the service provider for the issuer). Embodiments of the invention may be employed to create different versions of a hard copy and/or online version summary prospectus to accomplish various business objectives in any of numerous ways, as the invention is not limited to any particular implementation.

Figure 27:
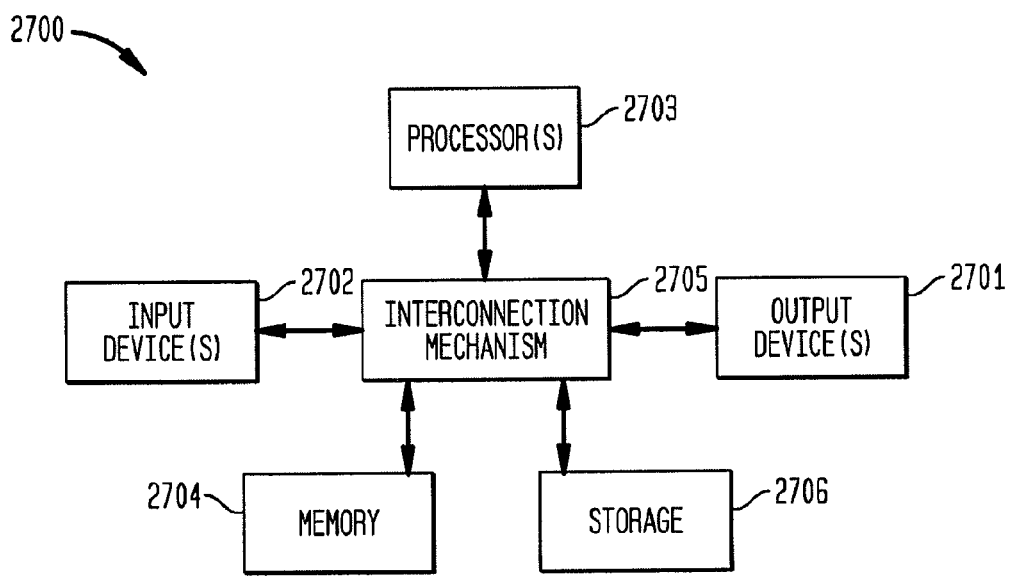
FIG. 27 is a block diagram depicting an example computer which may be employed to implement aspects of embodiments of the invention.

Various aspects of the systems and methods for practicing features of the invention may be implemented on one or more computer systems, such as the exemplary computer system 2800 shown in FIG. 27. Computer system 2800 includes input device(s) 2802, output device(s) 2801, processor 2803, memory system 2804 and storage 2806, all of which are coupled, directly or indirectly, via interconnection mechanism 2805, which may comprise one or more buses, switches, networks and/or any other suitable interconnection. The input device(s) 2802 receive(s) input from a user or machine (e.g., a human operator), and the output device(s) 2801 display(s) or transmit(s) information to a user or machine (e.g., a liquid crystal display). The processor 2803 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

The processor 2803 may also execute one or more computer programs to implement various functions. These computer programs may be written in any type of computer program language, including a procedural programming language, object-oriented programming language, macro language, or combination thereof. These computer programs may be stored in storage system 2806. Storage system 2806 may hold information on a volatile or non-volatile medium, and may be fixed or removable. Storage system 2806 is shown in greater detail in FIG. 28.

Figure 28:
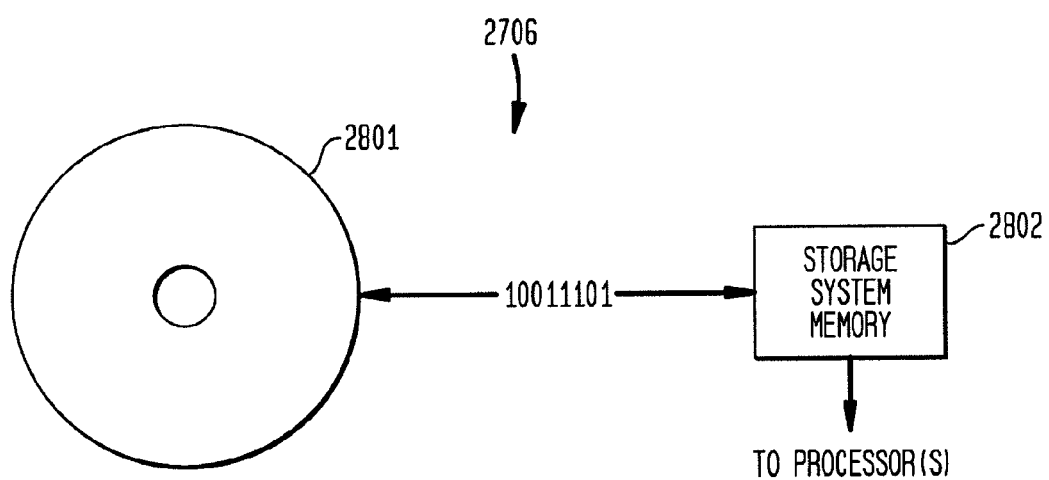
FIG. 28 is a block diagram depicting an example storage medium on which may be stored instructions and data which may be employed to implement aspects of embodiments of the invention.

Storage system 2806 typically includes a computer-readable and writable nonvolatile recording medium 2901, on which signals are stored that define a computer program or information to be used by the program. A medium may, for example, be a disk or flash memory. Typically, an operation, the processor 2803 causes data to be read from the nonvolatile recording medium 2901 into a volatile memory 2902 (e.g., a random access memory, or RAM) that allows for faster access to the information by the processor 2803 than does the medium 2901. The memory 2902 may be located in the storage system 2806, as shown in FIG. 29, or in memory system 2804, as shown in FIG. 28. The processor 2803 generally manipulates the data within the integrated circuit memory 2804, 2902 and then copies the data to the medium 2901 after processing is completed. A variety of mechanisms are known for managing data movement between the medium 2901 and the integrated circuit memory element 2804, 2902, and the invention is not limited thereto. The invention is also not limited to a particular memory system 2804 or storage system 2806.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

Further, it should be appreciated that a (client or server) computer may be embodied in any of a number of forms, such as a rack-mounted computer, desktop computer, laptop computer, tablet computer, or other type of computer. Additionally, a (client or server) computer may be embedded in a device not generally regarded as a computer but with suitable processing capabilities, including a Personal Digital Assistant (PDA), a smart phone or any other suitable portable or fixed electronic device.

Also, a (client or server) computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms.

Additionally, software may be written using any of a number of suitable programming languages and/or conventional programming or scripting tools, and also may be compiled as executable machine language code or intermediate code that is executed on a framework or virtual machine.

In this respect, the invention may be embodied as a storage medium (or multiple storage media) (e.g., a computer memory, one or more floppy disks, compact disks, optical disks, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The storage medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be provided in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
specifically programming at least one computer system to perform at least the following:
receiving a first financial information, wherein the first financial information represents at least one first document about at least one first financial instrument, wherein the at least one first document has a first release date;
generating a first taxonomy of the at least one first document, wherein the generating the first taxonomy comprises:
 1) identifying at least one first data element based at least in part on first content of the at least one first data element;
 storing at least one first record that describes at least the following about the at least one first data element:
  i) a first numerical identifier that uniquely identifies the at least one first data element,
  ii) a first description of the at least one first data element based at least in part on the first content,
  iii) the first content,
  iv) a first start location at which the first content of the at least one first data element starts,
  v) a first end location at which the first content of the at least one first data element ends, and
  vi) the first release date of the at least one first document; and
 2) identifying at least one second data element based at least in part on second content of the at least one second data element;
 storing at least one second record that describes at least the following about the at least one second data element:
  i) a second numerical identifier that uniquely identifies the at least one second data element,
  ii) a second description of the at least one second data element based at least in part on the second content,
  iii) the second content,
  iv) a second start location at which the second content of the at least one second data element starts,
  v) a second end location at which the second content of the at least one second data element ends, and
  vi) the first release date of the
  vii) the first release date of the at least one first document;
receiving a second financial information, wherein the second financial information represents at least one second document about the at least one first financial instrument, wherein the at least one second document has a second release date;
generating a second taxonomy of the at least one second document, wherein the generating the second taxonomy comprises:
 1) identifying at least one third data element based at least in part on third content of the at least one third data element;
 storing at least one third record that describes at least the following about the at least one third data element:
  i) a third numerical identifier that uniquely identifies the at least one third data element,
  ii) a third description of the at least one third data element based at least in part on the third content,
  iii) the third content, iv) a third start location at which the third content of the at least one third data element starts, v) a third end location at which the third content of the at least one second data element ends, and vi) the second release date of the at least one second document; and 2) identifying at least one fourth data element based at least in part on fourth content of the at least one fourth data element;

storing at least one fourth record that describes at least the following about the at least one fourth data element:

i) a fourth identifier that uniquely identifies the at least one fourth data element, ii) a fourth description of the at least one fourth data element based at least in part on the fourth content, iii) the fourth content, iv) a fourth start location at which the fourth content of the at least one fourth data element starts, v) a fourth end location at which the fourth content of the at least one fourth data element ends, and vi) the second release date of the at least one second document;

receiving at least one request for the at least one first data element and the at least one second data element about the at least one first financial instrument at a request date;

determining that the first content of the at least one first data element of the at least one first document has changed, by:

i) determining that the request date is after the second release date;

ii) determining that the first description of the at least one first data element of the at least one first document corresponds to either the third description of the at least one third data element of the at least one second document or the fourth description of the at least one fourth data element of the at least one second document; and iii) determining that the first content of the at least one first data element of the at least one first document differs from the third content or the fourth content respectively;

determining that the second content of the at least one second data element of the at least one first document has changed, by:

i) determining that the request date is after the second release date;

ii) determining that the second description of the at least one second data element of the at least one first document corresponds to either the third description of the at least one third data element of the at least one second document or the fourth description of the at least one fourth data element of the at least one second document; and iii) determining that the second content of the at least one second data element of the at least one first document differs from the third content or the fourth content respectively;

displaying, in response to the at least one request for the at least one first data element about the at least one first financial instrument, the at least one second document having: (1) the third content highlighted from the third start location until the third end location or (2) the fourth content highlighted from the fourth start location until the fourth end location after:

i) the determining that the first description of the at least one first data element of the at least one first document corresponds to the third description of the at least one third data element of the at least one second document and the determining that the first content of the at least one first data element of the at least one first document has changed; or ii) the determining that the first description of the at least one first data element of the at least one first document corresponds to the fourth description of the at least one fourth data element of the at least one second document and the determining that the first content of the at least one first data element of the at least one first document has changed; and displaying, in response to the at least one request for the at least one second data element about the at least one first financial instrument, the at least one second document having: (1) the third content highlighted from the third start location until the third end location or (2) the fourth content highlighted from the fourth start location until the fourth end location after:

i) the determining that the second description of the at least one second data element of the at least one first document corresponds to the third description of the at least one third data element of the at least one second document and the determining that the second content of the at least one second data element of the at least one first document has changed; or ii) the determining that the second description of the at least one second data element of the at least one first document corresponds to the fourth description of the at least one fourth data element of the at least one second document and the determining that the second content of the at least one second data element of the at least one first document has changed.

2. The method of claim 1, wherein the first description of the at least one first data element is further based on a first appearance of the at least one first data element and wherein the second description of the at least one second data element is further based on a second appearance of the at least one second data element.

3. The method of claim 1, wherein the at least one second document is a summary prospectus.

4. The method of claim 1, wherein the at least one first financial instrument is a mutual fund and wherein each description of each data element of each document is selected from the group consisting of: an investment objective, a fee or expense, a principal investment strategy, a principal risk, an annual total return, an investment advisor, a portfolio manager, a rule relating to a purchase or sale, and information on payments to an intermediary.

5. A specifically programmed computer system, comprising:

a non-transient computer memory having at least one region for storing computer executable program code; and at least one processor for executing the program code stored in the memory, wherein the program code comprises:

code to receive a first financial information, wherein the first financial information represents at least one first document about at least one first financial instrument, wherein the at least one first document has a first release date;

code to generate a first taxonomy of the at least one first document, wherein the code to generate the first taxonomy comprises:
1) code to identify at least one first data element based at least in part on first content of the at least one first data element;
code to store at least one first record that describes at least the following about the at least one first data element:
  i) a first numerical identifier that uniquely identifies the at least one first data element,
  ii) a first description of the at least one first data element based at least in part on the first content,
  iii) the first content,
  iv) a first start location at which the first content of the at least one first data element starts,
  v) a first end location at which the first content of the at least one first data element ends, and
  vi) the first release date of the at least one first document; and
2) code to identify at least one second data element based at least in part on second content of the at least one second data element;
code store at least one second record that describes at least the following about the at least one second data element:
  i) a second numerical identifier that uniquely identifies the at least one second data element,
  ii) a second description of the at least one second data element based at least in part on the second content,
  iii) the second content,
  iv) a second start location at which the second content of the at least one second data element starts,
  v) a second end location at which the second content of the at least one second data element ends, and
  vi) the first release date of the
  vii) the first release date of the at least one first document;
code to receive a second financial information, wherein the second finical information represents at least one second document about the at least one first financial instrument, wherein the at least one second document has a second release date;
code to generate a second taxonomy of the at least one second document, wherein the code to generate the second taxonomy comprises:
1) code to identify at least one third data element based at least in part on third content of the at least one third data element;
code to store at least one third record that describes at least the following about the at least one third data element:
  i) a third numerical identifier that uniquely identifies the at least one third data element,
  ii) a third description of the at least one third data element based at least in part on the third content,
  iii) the third content,
  iv) a third start location at which the third content of the at least one third data element starts,
  v) a third end location at which the third content of the at least one second data element ends, and
  vi) the second release date of the at least one second document; and
2) code to identify at least one fourth data element based at least in part on fourth content of the at least one fourth data element;
storing at least one fourth record that describes at least the following about the at least one fourth data element:
  i) a fourth identifier that uniquely identifies the at least one fourth data element,
  ii) a fourth description of the at least one fourth data element based at least in part on the fourth content,
  iii) the fourth content,
  iv) a fourth start location at which the fourth content of the at least one fourth data element starts,
  v) a fourth end location at which the fourth content of the at least one fourth data element ends, and
  vi) the second release date of the at least one second document;
code to receive at least one request for the at least one first data element and the at least one second data element about the at least one first financial instrument at a request date;
code to determine that the first content of the at least one first data element of the at least one first document has changed, comprising:
  i) code to determine that the request date is after the second release date;
  ii) code to determine that the first description of the at least one first data element of the at least one first document corresponds to either the third description of the at least one third data element of the at least one second document or the fourth description of the at least one fourth data element of the at least one second document; and
  iii) code to determine that the first content of the at least one first data element of the at least one first document differs from the third content or the fourth content respectively;
code to determine that the second content of the at least one second data element of the at least one first document has changed, comprising:
  i) code to determine that the request date is after the second release date;
  ii) code to determine that the second description of the at least one second data element of the at least one first document corresponds to either the third description of the at least one third data element of the at least one second document or the fourth description of the at least one fourth data element of the at least one second document; and
  iii) code to determine that the second content of the at least one second data element of the at least one first document differs from the third content or the fourth content respectively;
code to display, in response to the at least one request for the at least one first data element about the at least one first financial instrument, the at least one second document having: (1) the third content highlighted from the third start location until the third end location or (2) the fourth content highlighted from the fourth start location until the fourth end location after:
  i) the determining that the first description of the at least one first data element of the at least one first document corresponds to the third description of the at least one third data element of the at least one second document and the determining that the first content of the at least one first data element of the at least one first document has changed;
  ii) the determining that the first description of the at least one first data element of the at least one first document corresponds to the fourth description of the at least one fourth data element of the at least one second document and the determining that the first content of the at least one first data element of the at least one first document has changed; and code to display, in response to the at least one request for the at least one second data element about the at least one first financial instrument, the at least one second document having: (1) the third content highlighted from the third start location until the third end location or (2) the fourth content highlighted from the fourth start location until the fourth end location after:

i) the determining that the second description of the at least one second data element of the at least one first document corresponds to the third description of the at least one third data element of the at least one second document and the determining that the second content of the at least one second data element of the at least one first document has changed; or ii) the determining that the second description of the at least one second data element of the at least one first document corresponds to the fourth description of the at least one fourth data element of the at least one second document and the determining that the second content of the at least one second data element of the at least one first document has changed.

6. The system of claim 5, wherein the first description of the at least one first data element is further based on a first appearance of the at least one first data element and wherein the second description of the at least one second data element is further based on a second appearance of the at least one second data element.

7. The method of claim 1, wherein the at least one second document is a summary prospectus.

8. The method of claim 1, wherein the at least one first financial instrument is a mutual fund and wherein each description of each data element of each document is selected from the group consisting of: an investment objective, a fee or expense, a principal investment strategy, a principal risk, an annual total return, an investment advisor, a portfolio manager, a rule relating to a purchase or sale, and information on payments to an intermediary.

* * * * *

UNITED STATES PATENT AND TRADEMARK OFFICE
CERTIFICATE OF CORRECTION

PATENT NO. : 8,521,632 B2  
APPLICATION NO. : 12/508987  
DATED : August 27, 2013  
INVENTOR(S) : Russell E. Planitzer et al.

Page 1 of 1

It is certified that error appears in the above-identified patent and that said Letters Patent is hereby corrected as shown below:

In the Claims:

Col. 36, Ln. 47, Claim 1, Delete "the first release date of the" after the "vi)".

Col. 36, Ln. 48, Claim 1, Delete "vii)" before the phrase "the first release date".

Col. 39, Ln. 37, Claim 5, Delete "the first release date of the" after the "vi)".

Col. 39, Ln. 38, Claim 5, Delete "vii)" before the phrase "the first release date".

Signed and Sealed this
Twenty-fifth Day of February, 2014

Michelle K. Lee
*Deputy Director of the United States Patent and Trademark Office*